United States Patent [19]

Akao et al.

[11] Patent Number: 5,460,768
[45] Date of Patent: Oct. 24, 1995

[54] PROCESS FOR PRODUCING CONTAINER FOR PHOTOGRAPHIC FILM

[75] Inventors: Mutsuo Akao; Osamu Suzuki, both of Kanagawa, Japan

[73] Assignee: Fuji Photo Film Co., Ltd., Kanagawa, Japan

[21] Appl. No.: 147,550

[22] Filed: Nov. 5, 1993

[30] Foreign Application Priority Data

Nov. 6, 1992 [JP] Japan .................................. 4-297309

[51] Int. Cl.$^6$ .......................... B29C 45/74; B29C 45/77
[52] U.S. Cl. .................................. 264/297.2; 264/328.8; 264/328.13; 264/328.15; 425/549; 425/588
[58] Field of Search .......................... 264/297.2, 328.7, 264/328.13, 40.7, 328.8, 328.15; 425/588, 149, 547–549

[56] References Cited

U.S. PATENT DOCUMENTS

| | | | |
|---|---|---|---|
| 3,632,246 | 1/1972 | Ichikawa et al. | 425/149 |
| 3,941,534 | 3/1976 | Hunkar | 264/40.7 |
| 4,345,890 | 8/1982 | Hemmi et al. | 425/149 |
| 4,639,386 | 1/1987 | Akao . | |
| 4,921,737 | 5/1990 | Akao | 428/36.92 |
| 5,084,316 | 1/1992 | Akao | 428/36.92 |
| 5,178,805 | 1/1993 | Yokota | 264/40.1 |

FOREIGN PATENT DOCUMENTS

| | | |
|---|---|---|
| 0298375 | 1/1989 | European Pat. Off. . |
| 0372565 | 6/1990 | European Pat. Off. . |
| 0478788 | 4/1992 | European Pat. Off. . |
| 1138210 | 10/1962 | Germany .......................... 264/328.13 |
| 2532429 | 1/1977 | Germany . |
| 59-165634 | 9/1984 | Japan .............................. 264/328.13 |
| 61-227012 | 10/1986 | Japan .............................. 264/328.13 |

OTHER PUBLICATIONS

Patent Abstracts of Japan, vol. 8, No. 76 (M–288)9, Apr. 1984 JP–A–58 222 830 (Sumitomo Jukukai Kogyo K.K.) 24 Dec. 1983.
Database WPI, Week 9236, Derwent Publications, Ltd., London, GB; AN 92–296544 JP–A–4 205 827 (Japan Synthetic Rubber Co., Ltd.) 28 Jul. 1992.
Database WPI, Week 8435, Derwent Publications, Ltd., London, GB; AN 84–216045 JP–A–59 125 632 (Matsushita Electric Works) 20 Jul. 1984.

*Primary Examiner*—Jeffery R. Thurlow
*Attorney, Agent, or Firm*—Sughrue, Mion, Zinn, Macpeak & Seas

[57] ABSTRACT

A process for producing a container is disclosed including molding the container using an injection molding machine with a multicavity mold having not less than 12 cavities by charging a hot runner thermoplastic resin having a melt flow rate of 5 to 80 g/10 minutes to the multicavity mold, wherein not less than 70% of the total injected resin amount at each shot is injected at an injection speed which is adjusted at 150 to 270 mm/sec., and the remaining resin at each shot is injected at a final injection speed which is adjusted at 3 to 90 mm/sec. By employing the process, molding troubles such as burrs, stringiness, short shot and weld lines do not occur, and the container can be molded continuously for a long period under unmanned conditions without screening inspection.

13 Claims, 7 Drawing Sheets

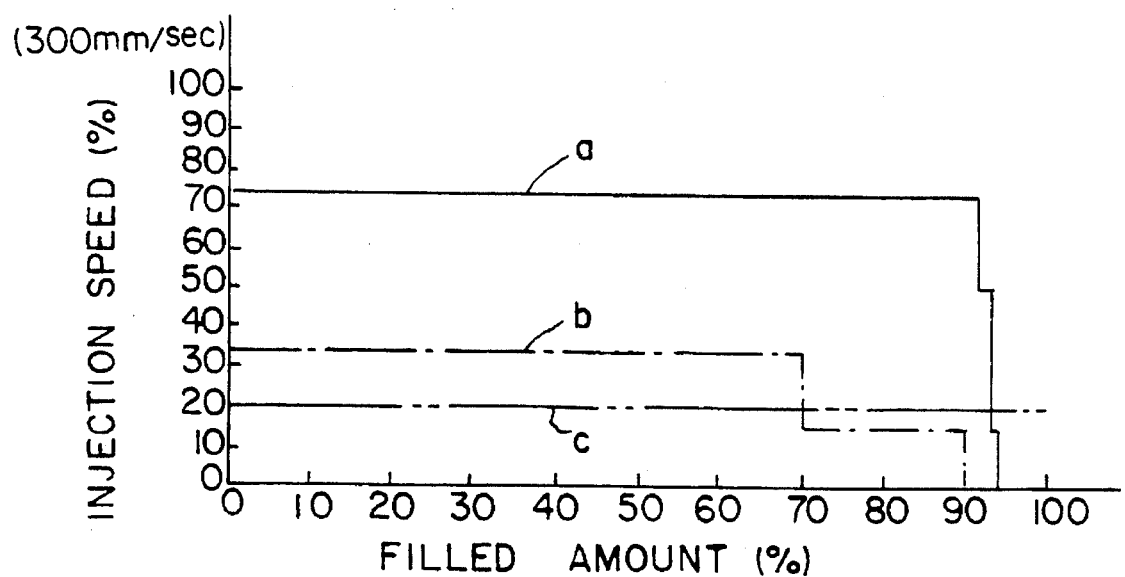
FIG. 14
FIG. 15
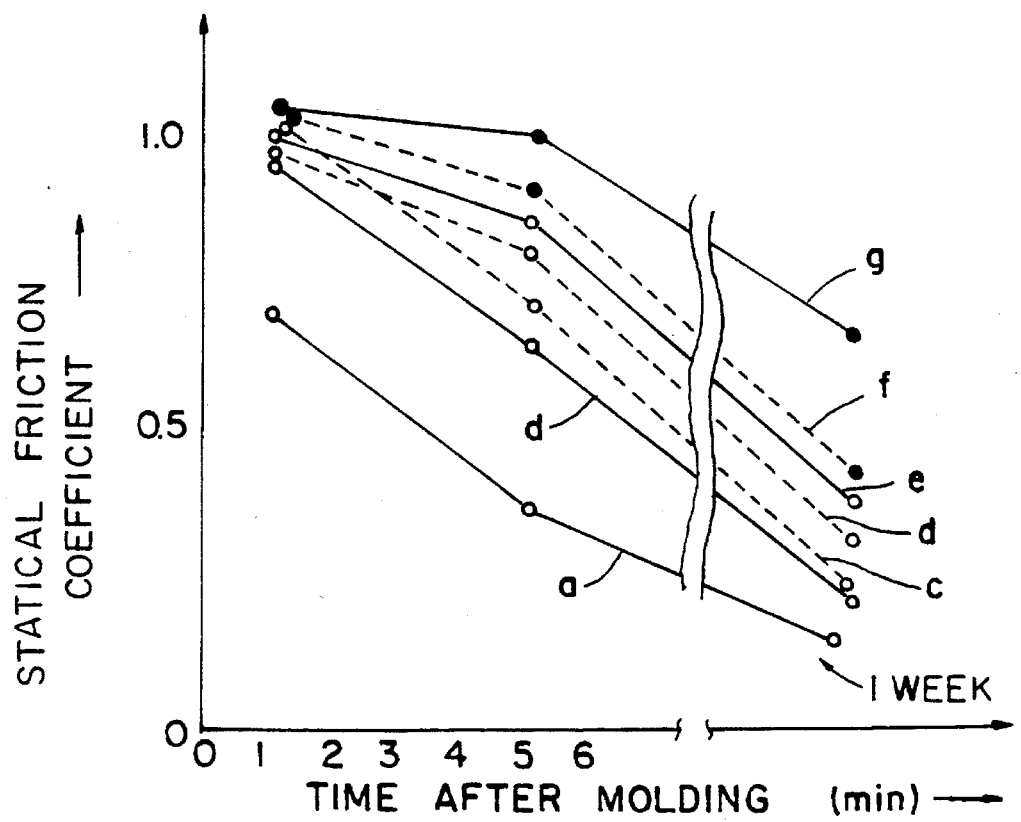

1

PROCESS FOR PRODUCING CONTAINER FOR PHOTOGRAPHIC FILM

BACKGROUND OF THE INVENTION

This invention relates to a process for producing a container for a photographic film.

Heretofore, containers for a photographic film were injection-molded by a multicavity mold having a number of cavities of not less than 12 in a hot runner type at a molding cycle time of not more than 10 seconds from polypropylene resin having a melt flow rate(MFR, ASTM D 1238) of 16 to 80 g/10 minutes, as disclosed in Japanese Patent KOKOKU 2-38939.

In the above conventional process, molding troubles, such as short shot, weld lines, burrs, stringiness and pinholes at resin gate portion, occurred at a rate of about 0.07%, and all of the molded products are inspected visually. Although a checking apparatus of pinholes has been developed as disclosed in Japanese Patent KOKAI 61-89551, the pinhole checking apparatus occasionally troubled by the occurrence of abrasion and biting. Moreover, burrs, stringiness and the like must be checked by visual inspection.

SUMMARY OF THE INVENTION

An object of the invention is to provide a process for producing a container for a photographic film wherein molding troubles, such as burrs and stringiness as well as short shot and weld lines, do not occur.

Another object of the invention is to provide a process for producing a container for a photographic film continuously for a long period under unmanned conditions without screening inspection resulting in the reduction of manufacturing cost by 30% or more.

Another object of the invention is to provide a process for producing a container for a photographic film capable of imparting surface gloss to the produced containers by injecting not less than 70% of the total resin amount to be injected to cavities of a mold rapidly.

The present invention provides a process for producing a container for a photographic film which has achieved the above objects, comprising molding the container using an injection molding machine in an injection speed variable type with a multicavity mold having a number of cavities of not less than 12 in a hot runner type from a thermoplastic resin having a melt flow rate (ASTM D-1238) of 5 to 80 g/10 minutes, wherein the injection speed of not less than 70% of the total injected resin amount at each shot is adjusted at 150 to 270 mm/sec., and the final injection speed is adjusted at 3 to 90 mm/sec.

BRIEF DESCRIPTION OF DRAWINGS

FIG. 14 is a graph of injection program indicating a relation between injection speed and filled resin amount.

FIG. 15 is a graph indicating a time course of statical friction coefficient after molding of container bodies for a photographic film varying the kind or blending amount of lubricant.

Figure 1:
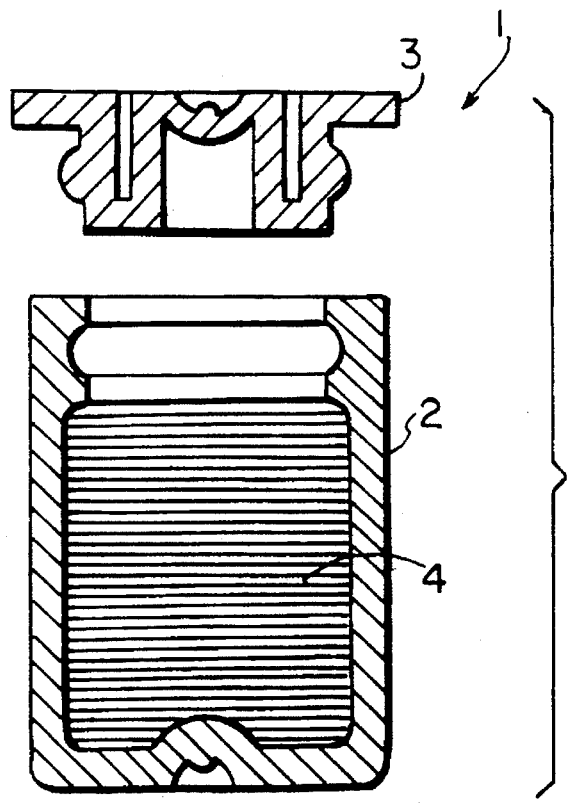
FIGS. 1 through 8 are sectional or perspective views each indicating a container for a photographic film applicable to the process of the invention.

1... Container for photographic film
2... Container body
3... Cap
4... Roughened face
20.. Container of resin pellets
21.. Silo
22.. Molding machine
25.. Pneumatic conveying pipe

DETAILED DESCRIPTION OF THE INVENTION

The injection molding machine used in the invention is in an injection speed variable type with a multicavity mold. The injection molding machine may be either in a multi-speed variable type or in continuous (stepless) speed variable type. The number of the cavities of the mold is not less than 12, usually 12 to 60, preferably 24 to 48. The mold is in a hot runner type. The injection speed of not less than 70% of the total injected resin amount at each shot is adjusted at 150 to 270 mm/sec. A suitable resin amount injected at this speed is in a range of 70 to 90%, preferably 80 to 98%, particularly preferably 90 to 97% of the total injected resin amount at each shot. On the other hand, the final injection speed, i.e. the injection speed of 30% of the total injected resin amount up to the last, preferably the injection speed of 20% of the total injected resin amount up to the last, is adjusted at 3 to 90 mm/sec., preferably 3 to 45 mm/sec., particularly preferably 3 to 30 mm/sec. It is necessary for transferring from the above main injection speed to the final injection speed, and the remaining resin amount is used for the transfer. By employing the above injection speed change, the occurrence of weld lines, short shot and the like is prevented by injecting not less than 70% of the total injected resin amount at an injection speed of 150 to 270 mm/sec., and the occurrence of burrs, stringiness and the like is prevented by adjusting the final injection speed to 3 to 90 mm/sec.

After resin has been charged by injection, it is preferable that the screw of injection molding machine is once retracted or stopped while cooling of the charged resin proceeds, and then injection holding pressure is loaded again. Thereby, various advantages can be obtained, such as less occurrence of deformation of molded containers, less variation of injected resin amount, less occurrence of bottom sink marks, the improvement in surface smoothness (uniformity of surface gloss) and less occurrence of weld line.

The container for a photographic film of the invention is formed of a thermoplastic resin having a melt flow rate (ASTM D-1238) (MFR) of 5 to 80 g/10 minutes. As the thermoplastic resin, there are ethylene copolymer resins, homopolyethylene resin, homopolypropylene resin, propylene copolymer resins, ABS resin, homopolystyrene resin, high impact polystyrene resin containing rubber, vinyl chloride resin, polyester resin and the like. For the purpose of the improvement in impact strength, light-shielding ability or the like, it is preferable that the above thermoplastic resin is blended with one or more of thermoplastic elastomers such as propylene-ethylene elastomer and propylene-ethylene-diene elastomer, synthetic rubbers and the like.

Representative thermoplastic resin elastomers and synthetic rubbers are nitrile rubbers, styrene-butadiene copolymer rubbers (containing random type and block type), polybutadiene rubbers, polyisoprene rubbers, polyisobutylene rubbers, polychloroprene rubbers, butylene rubbers, ethylene-propylene copolymer rubbers, ethylene-propylene-diene ternary copolymer rubbers, fluororubbers, silicone rubbers, ethylene-vinyl acetate copolymer rubbers, nitrile-isoprene copolymer rubbers, styrene-butadiene-styrene block copolymer rubbers, styrene-isoprene-styrene block copolymer rubbers, and the like. These thermoplastic resin elastomers and synthetic rubbers are effective in the improvement in the impact strength, dropping strength, etc. of containers for a photographic film. On the other hand, they are liable to decrease rigidity, to degrade injection moldability, to induce fogging on photographic film. Accordingly, a suitable content is less than 50 wt. %, preferably 2 to 45 wt. %, particularly preferably 5 to 40 wt. % of the resin composition which forms a container for a photographic film.

Among ethylene copolymer resins, L-LDPE resin and EEA resin are preferred, because they do not affect adversely photographic photosensitive materials, and have a great effect on the improvement in physical strength, excellent dispersibility of light-shielding material and a great strength of weld line.

Besides, it is also preferable to blend the other thermoplastic resins, various elastomers, such as synthetic rubber, various additives, modifiers, etc.

Among the ethylene copolymer resins, particularly preferred is ethylene-α-olefin copolymer resin which is called, in general, linear low density polyethylene (L-LDPE) resin.

The L-LDPE resin is called third polyethylene resin, and it is a low cost high strength resin, having the advantages of both low, medium density homopolyethylene resin and high density homopolyethylene resin, which meets the requirements, i.e. resource conservation and energy conservation, of the times. The L-LDPE resin is a copolymer of ethylene and α-olefin, and it has a linear structure with short branches. The number of carbon atoms of the α-olefin is 3 to 13. Preferable α-olefin has a number of carbon atoms of 4 to 10, and examples of the α-olefin are butene-1, 4-methylpentene-1, hexene-1, heptene-1, decene-1, dodecene-1 and octene-1. The density is usually in the degree of low or medium homopolyethylene resin, but in the container for a photographic film of the invention, a suitable L-LDPE resin is selected from those having a density (ASTM D-1505) in the range of 0.90 to 0.985 g/cm$^3$, preferably 0.930 to 0.985 g/cm$^3$, particularly preferably 0.941 to 0.985 g/cm$^3$ according to the object of use. In view of protecting the photographic film cartridge and ensuring sealability, in the case of cap separated from body type (FIG. 1, FIG. 2 etc.), a preferable Olsen rigidity (ASTM D-747) of a container body is not less than 5,000 g/cm$^2$ and that of a cap is not more than 4,500 g/cm$^2$. In the case of body-cap joined type (FIG. 3, FIG. 4, FIG. 7, FIG. 8, etc.), a preferable Olsen rigidity is 5,000 to 18,000 kg/cm$^2$.

As the polymerization process of L-LDPE resin, there are the vapor process and the liquid slurry process using a medium, low pressure apparatus and the ion polymerization process using an apparatus for the high pressure modified method.

Examples of commercial L-LDPE resin are "G-Resin" and "TUFLIN" (UCC), "NUC Polyethylene-LL" and "TUFTHENE" (Nippon Unicar), "Idemitsu Polyethylene-L" and Moretec (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Stamilex" (DSM) "Mitsubishi Polyethy-LL" (Mitsubishi Petrochemical), and the like.

Taking into consideration the case of reclamation treatment as waste, degradable plastic which is being developed or has already introduced in the market can be used for the container for a photographic film of the invention. For example, a biodegradable polymer of "BIOPOL" (ICI), "Polycaprolactone" (UCC) or the like is utilized, or a polymer indirectly collapsed by blending a biodegradable natural or synthetic polymer as an additive, such as polyethylene blended with starch, can be utilized.

In order to improve industrial waste treatment, it is also preferable to blend a recently commerciallized synthetic biodegradable plastic which can be decomposed up to carbon dioxide and water by the action of microorganisms ("Bionol", Showa Polymer, which is a special polyester resin synthesized from dicarboxylic acid and the like), a polymer alloy of modified polyvinyl alcohol having biodegradability and maize starch in an amount of not less than 50 wt. %, preferably not less than 70 wt. %, more preferably not less than 80 wt. %, particularly preferably not less than 90 wt. %, into one or more layers of the container of the invention, in view of the improvement in industrial waste treatment. Particularly, it is preferable to blend them into one or more layers other than the layer which is to contact photographic photosensitive materials.

Moreover, it is also possible to utilize a photodegradable polymer, such as ELO copolymer wherein carbonyl groups are introduced into the main chain as a photosensitization group at the time of polymerization of ethylene, i.e. copolymerization of ethylene and carbon monoxide, polymers to which photodegradability is imparted by adding transition metal salt, oxidation accelerator, photosensitizer or the like to base polymer (Japanese Patent KOKAI 3-129341). It is also possible to combine degradable polymers, such as biodegradable polymer, photodegradable polymer, water-soluble polymer and the like.

For transparent containers, preferable resin compositions are polyolefin resin compositions containing, in the total amount of not less than 90 wt. %, of ethylene-α-olefin copolymer resin having a density of not less than 0.935 g/cm$^3$ particularly ethylene-α-olefin random copolymer resin having a density of 0.941 to 0.985 g/cm$^3$ wherein the α-olefin has a number of carbon atoms of 3 to 10, and one or more of propylene-ethylene random copolymer resins and homopolyethylene resins having a density of 0.935 to 0.985 g/cm$^3$, particularly containing nucleating agent For containers colored black, silver, white or the like, preferable resins are homopolyethylene resins having a density of not less than 0.935 g/cm$^3$ preferably high density homopolyethylene resins having a density of 0.941 to 0.985 g/cm$^3$ and propoylene-ethylene block copolymer resins because they can be colored in a great color density and are resistant to cracking due to their great impact strength. Particularly, in the case of recycling, preferable resin compositions are polyethylene resin compositions containing in an amount of not less than 70 wt. % preferably not less than 80 wt. %, particularly preferably not less than 90 wt. % of, one or more of homopolyethylene resins, ehylene-α-olefin copolymer resins and thermoplastic resins, having a MFR (ASTM D-1238 E condition) of 3 to 50 g/10 minutes, preferably 5 to 25 g/10 minutes and a density (ASTM D-1505) of 0.930 to 0.985 g/cm$^3$ preferably 0.941 to 0.985 g/cm$^3$ and containing 0.0005 to 1 wt. % preferably 0.001 to 0.5 wt. % of antioxidant. p It is preferable to add a lubricant for a photographic film of the invention in order to decrease bursting sound, to shorten molding cycle, to decrease molding troubles, such as abrasion, bottom sink mark and buckling, to improve insertion of photographic film, wear resistance, slipping character and the like.

Suitable lubricants, which do not affect photographic film adversely, are described below.

Silicone lubricants:
dimethylpolysiloxanes and modified thereof in various grades, carboxyl-modified silicon, α-methylsyrene-modified silicone, α-olefin-modified silicone, polyether-modified silicone, epoxy-modified silicone, amide-modified silicone, amino-modified silicone, alcohol-modified silicone (Shin-Etsu Silicone, Nippon Unicar, Toray Silicone), etc.

Oleic amide lubricants:
"ARMOSLIP-CP" (Lion Akzo Co., Ltd.), "NEWTRON" and
"NEWTRON E-18" (Nippon Fine Chemical Co., Ltd.),
"AMIDE-O" (Nitto Kagaku K.K.), "DIAMID O-200" and
"DIAMID G-200" (Nippon Kasei Chemical Co., Ltd.),
"ALFLOW E-10" (Nippon Oil and Fats Co., Ltd.), etc.

Erucic amide lubricants:
"ALFLOW P-10" (Nippon Oil and Fats Co., Ltd.),
"NEWTRON-S" (Nippon Fine Chemical Co., Ltd.),
"LUBROL" (I.C.I.),
"DIAMID L-200" (Nippon Kasei Chemical Co., Ltd.), etc.

Stearic acid amide lubricants:
"ALFLOW S-10" (Nippon Oil and Fats Co., Ltd.),
"FATTY AMIDE S" (Kao Corp.),
"AMIDE HT" (Lion),
"NEWTROM 2" (Nippon Fine Chemical Co., Ltd.),
"DIAMID 200" and "DIAMID AP-1"(Nippon Kasei Chemical Co.,Ltd.),
"AMIDE S" (Nitto Kagaku K.K.), etc.

Bis fatty acid amide lubricants:
"BISAMIDE" (Nitto Kagaku K.K.),
"DIAMID NK BIS", "LUBRON O",
"DIAMID-200 BIS" and "SLIPAX-KN" (Nippon Kasei Chemical Co., Ltd.),
"AMIDE 60" (Kawaken Fine Chemicals Co., Ltd.)
"ARMOWAX-EBS" (Lion Akzo Co., Ltd.),
"HOECHST WAX-C" (Hoechst Japan),
"CHEMETRO WAX-100" (Nissan Ferro Chemical Co., Ltd.), etc.

Alkylamine lubricants:
"ELECTROSTRIPPER TS-2" (Kao Corp.), etc.

Hydrocarbon lubricants:
liquid paraffin, natural paraffin, microwax, synthetic paraffin, polyethylene wax, polypropylene wax, chlorinated hydrocarbon, fluorocarbon, etc.

Fatty acid lubricants:
higher fatty acids preferably more than $C_{12}$, hydroxy fatty acids, etc.

Ester lubricants:
fatty acid lower alcohol esters such as butyl stearate, fatty acid polyol esters, fatty acid polyglycol esters, fatty acid fatty alcohol esters, etc.

Alcohol lubricants:
polyols, polyglycols, polyglycerols, etc.

Metallic soap:
metal salts such as Li, Na, K, Mg, Ca, Sr, Ba, Zn, Cd, Al, Sn, Pb salts of higher fatty acids such as lauric acid, stearic acid, ricinoleic acid, naphthenic acid, oleic acid, etc.

Partial esters of fatty acid and polyol:
"MONOGLY M" (Nippon Oil and Fats Co., Ltd,,
"FATTY ACID MONOGLYCERIDE R-60" and "FATTY ACID
MONOGLYCERIDE O-60" (Matsumoto Yushi Seiyaku), ricinoleic acid monoglyceride, behenic acid monoglyceride, oleic acid monoglyceride, erucic acid monoglyceride, "RIKEMAL S-300" and "RIKEMAL PS-100" (Riken Vitamin Co., Ltd.), "MONOGLYCERIDE S" and "MONOGLYCERIDE NS" (Kao Corp.), etc.

The lubricant may be a single material or a combination of two or more of the above lubricants or a combination with other plasticizer or low molecular weight thermoplastic resin. Moreover, lubricants different in appearance may be combined, such as a combination of solid and paste or a combination of solid and liquid.

A suitable blending amount of the lubricant is 0.001 to 10 wt. %, preferably 0.005 to 7 wt %, particularly preferably 0.01 to 5 wt. %. When the blending amount is less than 0.001 wt. %, the blending effect of the lubricant is insufficient. On the other hand, when the blending amount exceeds, screw slip occurs between the screw of an extruder and resin to become extruded resin amount unstable. Moreover, bleeding out increases to induce various troubles, such as degradation of appearance, greasiness and adhesion of dust. Accordingly, it is preferable to blend a minimum amount. Particularly, it is preferable that the lubricant contains a fatty amide which is excellent in a great lubricating effect, no adverse affect upon photographic properties of a photographic film and cheapness, and is blended in a minimum amount.

Figure 16:
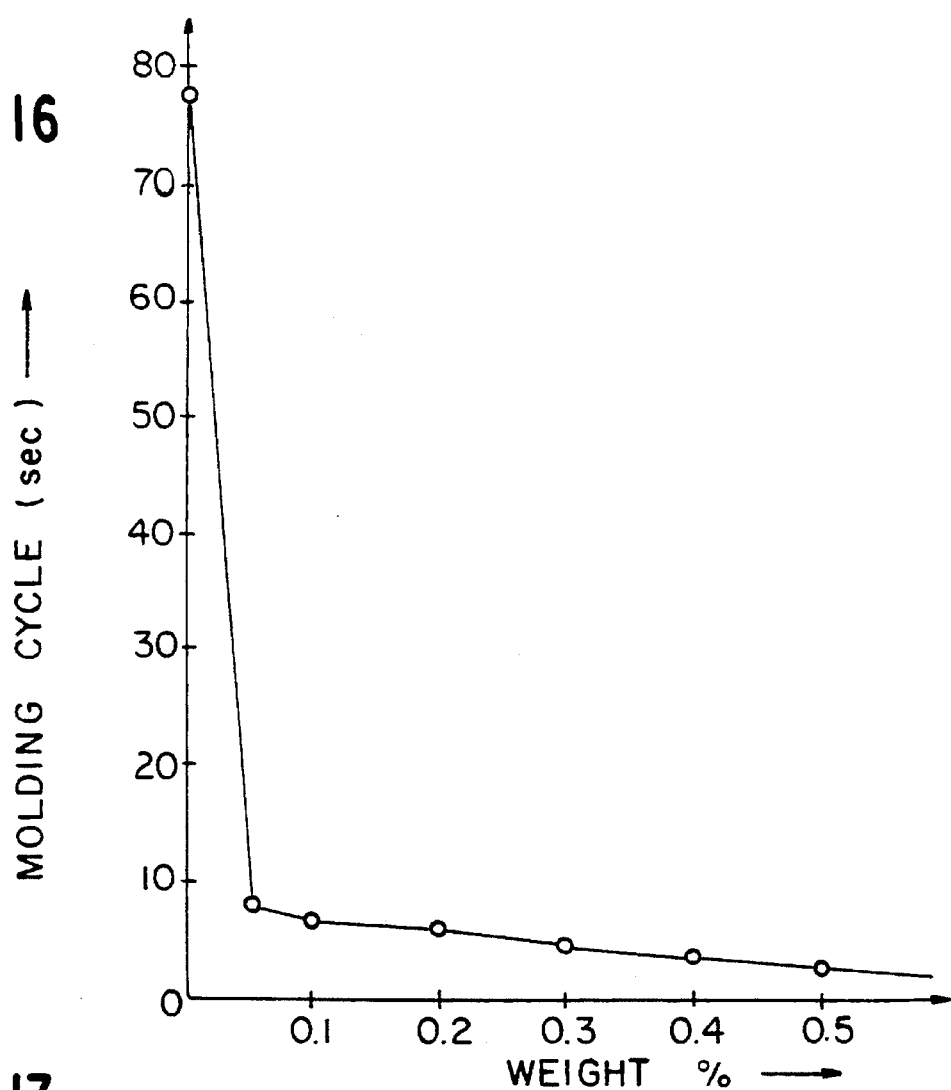
FIG. 16 is a graph indicating a relation between blended amount of oleic amide lubricant and molding cycle time.

FIG. 16 shows a relationship between some lubricants varying the kind and the blending amount and statical friction coefficient of a container body for a photographic film. The resin used was propylene-ethylene copolymer resin having a MFR (ASTM D-1238 L condition) of 40 g/10 minutes, and in the figure, a indicates the resin blended with 0.5 wt. % of oleic amide, b indicates the resin blended with 0.3 wt. % of oleic amide, c indicates the resin blended with 0.3 wt. % of erucic amide, d indicates the resin blended with 0.3 wt. % of stearic amide, e indicates the resin blended with 1.0 wt. % of alkylamine lubricant ("Electrostripper TS-2", Kao), f indicates the resin blended with 0.1 wt/% of oleic amide, and g indicates the resin blended with no lubricant.

Figure 17:
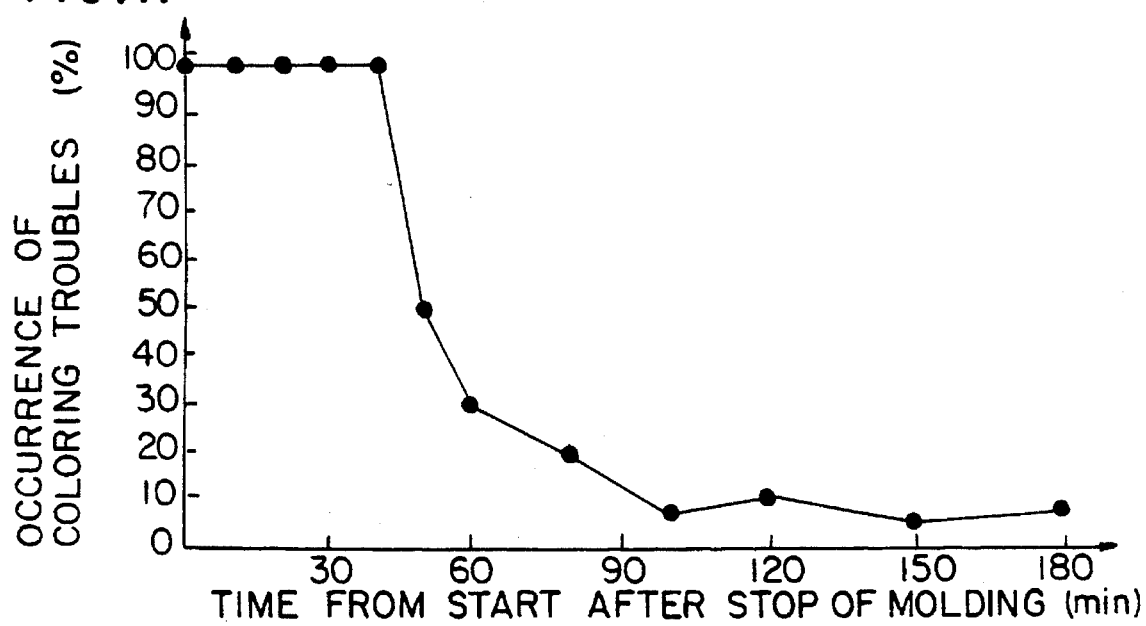
FIG. 17 is a graph indicating a time course of the rate of coloring troubles from the start of molding after molding was once stopped.

FIG. 17 shows a relationship between lubricant and moldability. The figure indicates a relationship between the blending amount of oleic amide and molding cycle, when a cap of a photographic film container was molded using LDPE resin blended with oleic amide. The mold was a 24-cavity mold in a hot runner type, and the molding machine used was an injection molding machine with a toggle type clamping machanism at a mold clamping pressure of 150 t.

Antioxidant may be blended into the container for a photographic film of the invention in order to prevent the generation of the materials which adversely affect photographic properties of photographic film by thermal decomposition (e.g. alcohols, aldehydes, ketones, carboxylic acids) and to prevent resin yellowing. When lumps (agglomenates of foreign substance) generate by resin yellowing, they induce gate clogging resulting in the occurrence of molding troubles, such as short short, and occasionally the occurrence of no shot.

Examples of the antioxidant are as follows:

Phenolic Antioxidants:

vitamin E, vitamin E carboxylate ester, 6-t-butyl-3-methylphenol derivatives, 2,6-di-t-butyl-p-cresol, 2,2'-methylenebis-(4-ethyl-6-t-buylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3', 5'-di-t-butyl-4'-hydroxyphenylipropionate, 2,2'-methylenebis(4-methyl-6-t-butylphenol), 4,4'-butylidenebis(3-methyl-6-t-butylphenol), stearyl-β-(3, 5-di-4-butyl-4-hydroxyphenylpropionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) propionate]methane, etc.

Ketone-Amine Condensae Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-β-phenylenediamine, N,N'-di-β-naphthylpphenylenediamine, N-(3'-hydroxybutylidene)-1-naphtylamine, etc.

Imidazole Antioxidants:

2-mercaptobenzoimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derivatives, 1,3-bis(dimethylaminopropyl)-2-thiourea, etc.

Other Antioxidants:

Those useful for air oxidation, such as dilauryl thiodipropionate, etc.

Hindered phenolic antioxidants:

tetrakis [methylene-3-(3,5-di-tert-butyl-4-hydroxyphenol)propionate], methane, 2,2-thio[diethyl-bis-3-(3,5-di-tert-butyl-4-hydroxyphenol)propionate], n-octadecyl-3-(4'-hydroxy-3,5'-di-tert-bytylphenol) propionate, 4,4'-thiobis(3-methyl-6-tert-butylphenol), 4,4-methylene-bis(3,5-di-tert-butylphenol), 2,6-di-tert-butyl-para-cresol, octadecyl-3-(3,5-di-tert-butyl-4-hydroxyphenyl)propionate, 1,3,5-trimethyl-2,4,6-tris(3,5-di-tert-butyl-4-hydroxybenzyl)benzene, tetrakis[methylene(3, 5-di-tert-butyl-4-hydroxy-hydrocinnamate]methane, octadecyl-3,5-di-tert-butyl-4-hydroxy-hydrocinnamate, 2,2',2'-tris (3,5-di-tert-butyl-4-hydroxyphenyl) propionyloxy ethylisocyanulate, 1,3,5-tris(4-tert-butyl-3-hydroxy-2,6-di-methylbenzyl) isocyanulate, tetrakis(2,4-di-tert-butylphenyl)-4,4'-biphenylene diphosphite ester, 4,4'-triobis-(6-tert-butyl-o-cresol), 2,2'-thiobis-(6-tert-butyl-4methylphenol), tris-(2-methyl-4-hydroxy-5-tertbutylphenyl)butane, 2,2'-methylene-bis-(4-methyl-6-tert-butylphenol), 4,4'-methylene-bis-(2, 6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-m-cresol) and the like.

Preferable antioxidants have a melting point of more than 100° C., because of small bleeding out, thermal decomposition and adverse affect upon photographic properties of photographic photosensitive materials, particularly preferably more than 120° C.

Preferable antioxidants are phenolic antioxidants, and hindered phenolic antioxidants are particularly preferable. On the other hand, it is effective to use BHT, low volatile high molecular weight hindered phenolic antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined. However, antioxidant is a reducing substance which naturally adversely affects upon photographic film, and accordingly, it is necessary to select its kind and blending amount in view of taking a balance between the function to inhibit thermal decomposition. Preferable antioxidants are phenolic antioxidants and phosphorus-containing antioxidants because of rare adverse effets, such as fogging and sersitivity deviation, upon photographic film, and as the phenolic antioxidant, hindered phenolic antioxidants are particularly preferable. Particularly, it is preferable to combine two or more of phenolic antioxidants and/or phosphorus-containing antioxidants. It is particularly preferable to incorporate a combination of one or more of the following hindered phenolic antioxidants in an amount of 0.0001 to 1 wt. %, preferably 0.0001 to 0.8 wt. %, particularly preferably 0.0001 to 0.5 wt. % and one or more of the following phosphite antioxidants in an amount of 0.0001 to 1 wt. %, preferably 0.0001 to 0.8 wt. %, particularly preferably 0.0001 to 0.5 wt, %, of the resin composition which forms a container for a photographic film, and the contant of all antioxidants in the resin composition is arranged to 0.0002 to 2.0 wt. %, preferably 0.0002 to 1.6 wt. %, particularly preferably 0.0002 to 1.0 wt. %. The above hindered phenolic antioxidants are tetrakis [methylene-3-(3,5-di-tert-butyl-4-hydroxyphenol) propionate]methane, 2,2-thio[diethyl-bis-3-(3,5-di-tert-butyl-4-hydroxyphenol)propionate], n-octadecyl-3-(4'-hydroxy-3,5'-di-tert-bytylphenol)propionate, 4,4'-thiobis(3-methyl-6-tert-butylphenol), 4,4-methylene-bis(3, 5-di-tert-butylphenol), 2,6-di-tert-butyl-para-cresol. The above phosphite antioxidants are tetrakis-(2,4-di-tert-butylphenyl)-4,4'-biphenylene-diphosphite, bis-(2,4-di-tert-butylphenyl)pentaerythrital-di-phosphite, tris-(2,4-di-tert-butylphenyl)phosphite, di-stearylpentaerythritol-di-phosphite. When the above all antioxidant content is less than 0.0002 wt. %, the blending effect of the antioxidants is insufficient. On the other hand, when the above all antioxidant content exceeds 2.0 wt. %, various troubles occur, such as adverse effect, e.g. fogging and sensitivity deviation, upon photographic film, the increase of fuming upon injection molding, gradual bleeding out of the surface of containers for a photographic film to degrade appearance, touch, etc.

A suitable content of the antioxidant is 0.0002 to 2.0 wt. %, preferably 0.0002 to 1.6 wt. %, particularly preferably 0.0002 to 1.0 wt. %. When the content is less than 0.0002 wt. %, the blending effect is small. Degradation of photographic properties, such as fogging and sensitivity deviation, occurs by the thermal decomposition of resin, lumps increase by resin yellowing, and cloring trouble increases. While, when the content is beyond 1 wt. %, photosensitive materials are adversely influenced by antioxidant, resulting in the occurrence of fogging or sensitivity derivation. When antioxidant is combined with carbon black, oxidation inhibition and prevention of coloring synergistically appears.

Besides, other antioxidants usable in the invention can be selected from those disclosed in "Plastic Data Handbook" (published by Kogyo Chosa Kai), pages 794–799, "Plastic Additives Data Collection" (published by Kagaku Kogyo), pages 327–329, "Plastic Age Encyclopedia, Advance Edition 1986" (published by Plastic Age), pages 211–212, etc.

The mechanism of the antioxidant so as not to affect photographic photosensitive materials is considered as follows:

Oxidative degradation tends to occur in polyolefin resin having more $CH_3$ branches due to a greater oxygen absorption. Accordingly, oxidative degradation occurs in the order to more: polypropoylene resin>homopolyethylene resin>ethylene-α-olefin copolymer resin: less.

Various polyethylene resins containing ethylene-α-olefin copolymer resins and various polypropylene resins being representative crystalline themoplastic resins are hydrocarbons, and it is considered that when a radical group is produced through dehydration of hydrocarbon in the presence of oxygen, antioxidation proceeds in the following formulas as chain reaction.

$RH \rightarrow R\cdot$ $R\cdot + O_2 \rightarrow ROO\cdot$ $ROO\cdot + \rightarrow ROOH + R\cdot$ $ROOH \rightarrow RO\cdot + \cdot OH$ $RO\cdot + RH \rightarrow ROH + R\cdot$ $\cdot OH + RH \rightarrow HOH + R\cdot$ Thus, the oxidation of hydrocarbon is accelerated to produce a great quantity of alcohols, aldehydes, acids and the like, and they react with each other to produce polymer. In order to prevent oxidation of hydrocarbon, it is necessary to intercept the above chain reaction, and antioxidant is used for that purpose. Besides, it is also preferable to add the following radical scavenger.

As the radical scavenger suitable for the invention, there are 1,1-diphenyl-2-picrylhydrazyl, 1.3.5-triphenyl-ferudazyl, 2.2.6.6-tetramethyl-4-piperidone-1-oxyl, N-(3-N-oxyanilino-1.3-dimethylbytylidene)anilinoxide, high valency metal salts, such as ferric chloride, diphenylpicrylhydrazine, diphenyamine, hydroquinone, t-butylcatechol, dithiobenzyldisulfide, p.p'-ditolyltrisulfide, benzoquinone derivatives, nitro compounds, nitroso compounds, and the like. Among them, to use hydroquinone is particularly preferred. The above radical scavenger may be used as a single material, or several kinds may be combined. A suitable content of the radical scavenger is 1,000 to 10,000 ppm.

As the antioxidant, there are radical group chain terminator which reacts with radical groups, mainly ROO·, which are chain carriers, to inactivate them, and peroxide decomposer which decomposes hydroperoxide ROOH which is the main source of radical groups, to stabilize it. The radical group chain terminator includes alkylphenol antioxidant and aromatic amine antioxidant. The peroxide decomposer includes sulfur-containing antioxidant and phosphorus-containing antioxidant.

Since various antioxidants are reducing agent which adversely affects greatly photographic film having a high sensitivity compared with diazo photosensitive paper and photographic paper, unless the kind and blending amount of antioxidant is carefully examined, degradation in quality of photographic film becomes great.

Container caps were continuously molded for a long time, and after the molding was once stopped, the molding was started again. The occurrence of resin yellowing trouble (coloring trouble) was determined, and shown in FIG. 18.

The container for a photographic film of the invention may be blended with various organic or inorganic nucleating agent in order to shorten molding cycle, to improve transparency, hardness and rigidity and to decrease remainders at gate due to the improvement in crystallization rate.

The organic nucleating agent includes carboxylic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1,3,2,4-dibenzylidenesorbitol, the di-substituted benzylidene-sorbitol represented by the following formula;

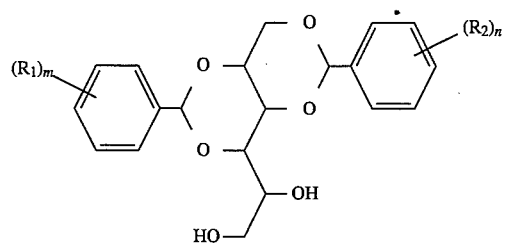

In the formula, $R_1$ and $R_2$ indicate an alkyl group or an alkoxy group having a number of carbon atoms of 1 to 8 or a halogen, and m and n are 0 to 3 and $m+n \leq 1$.

metal salts, such as calcium salt and magnesium salt, of stearyl lactic acid, the compounds, such as N-(2-hydroxyethyl)-stearylamine, represented by the following formula;

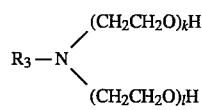

In the formula, $R_3$ indicates an alkyl group having a number of carbon atoms of 8 to 30, and k and l are 0 to 10 and $k+l \leq 1$.

metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid.

Among the organic nucleating agent, sorbitol compound is excellent in a great crystallization-accelerating effect, rare adverse affect on photographic properties, the decrease of molding troubles, the shortening of molding cycle and the improvement in rigidity and in appearance.

Examples of the sorbitol compound are as follows:
di-(o-methylbenzylidene)sorbitol
o-methylbenzylidene-p-methylbenzylidene sorbitol
di-(m-methylbenzylidene)sorbitol
m-methylbenzylidene-o-methylbenzylidene sorbitol
di-(p-methylbenzylidene)sorbitol
m-methylbenzylidene-p-methylbenzylidene sorbitol
1.3-heptanylidenesorbitol
1.3,2.4-diheptanylidenesorbitol
1.3,2.4-di(3-nonyl-3-pentenylidene)sorbitol
1.3-cyclohexanecarbylidenesorbitol
1.3,2.4-dicyclohexanecarbylidenesorbitol
1.3,2.4-di(p-methylcyclohexanecarbylidene)sorbitol
Aromatic hybrocarbon groups or derivatives thereof
1.3-benzylidenesorbitol
1.3,2.4-dibenzylidene-D-sorbitol
1.3,2.4-di(m-methylbenzylidene)sorbitol
1.3,2.4-di(p-methylbenzylidene)sorbitol
1.3,2.4-di(p-hexylbenzylidene)sorbitol
1.3,2.4-di(1-naphthalenecarbylidene)sorbitol
1.3,2.4-di(phenylaceylidene)sorbitol
1.3.2.4-di(methylbenzyliden)sorbitol
1.3.2.4-di(ethylbenzylidene)sorbitol
1.3.2.4-di(propylbenzyledene)sorbitol
1.3.2.4-di(methoxybenzylidene)sorbitol
1.3.2.4-di(ethoxybenzylidene)sorbitol
1.3.2.4-di(P-methylbenzylidene)sorbitol
1.3.2.4-di(P-chlobenzylidene)sorbitol
1.3.2.4-di(P-methoxybenzylidene)soritol
1.3.2.4-di(alkilbenzylidene)sorbitol
1.3.2.4-di(methylbenzylidene)sorbitol
aluminumbenzoate, etc.

A suitable blending amount of organic nucleating agent is 0.005 to 5 wt. %, preferably 0.01 to 3 wt. %, more preferably 0.03 to 2 wt. %, the most preferably 0.05 to 1 wt. %.

Inorganic nucleating agent includes an alkali metal hydroxide, such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogencarbonate and potassium hydrogencarbonate, an alkaline earth hydroxide, such as calcium hydroxide, magnesium hydroxide and barium hydroxide, an alkaline earth oxide, such as calcium oxide, and an alkaline earth carbonate, such as calcium carbonate. A suitable blending amount of inorganic nucleating agent is 0.01 to 5 wt. %, preferably 0.05 to 3 wt. %.

The nucleating agent is not limited to the above compounds, and any known nucleating agent may be employed. Morover, two or more nucleating agents may be used simultaneously.

Preferable nucleating agents are organic nucleating agent of dibenzylidenesorbitol compounds, and the di-substituted benzylidenesorbitol compositions described below are particularly preferable for the polyolefin resins, preferably propylene-α-olefin random copolymer resin, homopolyethylene resin having a density (ASTM D-1505) of not less than 0.935 g/cm$^3$ and ethylene-α-olefin copolymer resin having a density (ASTM D-1505) of not less than 0.930 g/cm$^3$, which belong to the crystalline resin of the invention in view of the improvement in physical strength and rigidity, shortening of molding cycle, the decrease of molding troubles, and the improvement in foreign odor and blending out which are the defects of conventional organic nucleating agent.

The di-substituted benzylidenesorbitol composition contains solid powder of the dibenzylidenesorbitol derivative represented by the following general formula and the following higher fatty acid as the essential components, and the surface of the solid powder of the dibenzylidenesorbitol derivative is coated with the higher fatty acid.

$$R-\underset{}{\bigcirc}-\overset{H}{\underset{}{C}}\begin{array}{c}H\\ O-\overset{|}{C}-H\\ H-\overset{|}{C}-O\\ O-\overset{|}{C}-H\\ H-\overset{|}{C}-O\\ H-\overset{|}{C}-OH\\ H-\overset{|}{C}-OH\\ H\end{array}\overset{H}{\underset{}{C}}-\underset{}{\bigcirc}-R'$$

In the furmula, R and R' independently represent an atom or a group selected from chlorine atom, methyl group and ethyl group, preferably chlorine atom or methyl group.

$$CH_3(CH_2)_n COOH$$

In the formula, n represents a number of 14 to 30, preferably 18 to 27, particularly preferably 20 to 25.

Preferable dibenzylidenesorbitol derivatives of the above general formula are 1.3.2.4-di(p-methylbenzylidene)sorbitol, 1.3,2.4-di(p-ethylbenzylidene)sorbitol, 1.3-p-methylbenzylidene-2.4-p-chlorobenzylidenesorbitol, 1.3-p-methylbenzylidene-2.4-p-ethylenzylidenesorbitol, 1.3-p-chlorobenzylidene-2.4-p-methylbenzylidensorbitol and the like. Particularly preferable dibenzylidenesorbitol derivatives are 1.3,2.4-di(p-methylbenzylidene)sorbitol, 1.3-p-methylbenzylidene-2.4-p-chlorobenzylidene sorbitol and 1.3-p-chlorobenzylidene-2.4-p-methylbenzyidenesorbitol.

Preferable higher fatty acids are behenic acid, stearic acid and palmitic acid. Behenic acid is the most preferable, and stearic acid is in the second place.

The particle size of the solid powder of the dibenzylidene sorbitol derivative is not particularly limited, but a particle size distribution of 30 to 100 mesh is preferred.

Preferable organic nucleating agent composition contains 95 to 50 parts by weight, preferably 90 to 50 parts by weight, of the dibenzylidenesorbitol and 5 to 50 parts by weight, preferably 10 to 50 parts by weight, of the higher fatty acid so that the total of both components is 100 parts by weight.

The di-substituted dibenzylidenesorbitol can be prepared by adding the solid powder of the dibenzylidenesorbitol derivative to an aqueous emulsion containing the higher fatty acid in the above ratio, stirring to form a coating layer of the higher fatty acid on the surface of the solid powder of the dibeyzylildenesorbitol derivative, filtering out the dibeyzylidenesorbitol derivative powder coated with the higher fatty acid, washing followed by drying. The above aqueous emulsion of the higher fatty acid is prepared by dispersing an organic solvent solution of the higher fatty acid in a concentration of 5 to 50 wt. %, preferably 10 to 50 wt. % into water together with a small amount, such as 1 to 10 parts by weight, preferably 2 to 5 parts by weight, of surfactant. The presence of the higher fatty acid coating formed on the surface of the solid powder of the dibenzylidene sorbitol derivative can be confirmed by coloring the coating using a dye and then observing.

The polyolefin resin, to which the di-substituted benzylidenesorbitol composition is blended as an additive in order to improve transparency, physical strength and to decrease bleeding out and odor, includes homopolymers and copolymers of aliphatic monoolefin having a number of carbon atoms of 2 to 6, such as homopolypropylene resin, low density homopolyethylene resin, high density homopolyethylene resin, linear polyethylene (ethylene-olefin copolymer) resin, ethylene-propylene copolymer resin and the like, having a number average molecular weight of 10,000 to 200,000, preferably 20,000 to 150,000.

A suitable blending amount of the dibenzylidenesorbitol derivative coated with higher fatty acid is 0.01 to 2 parts by weight, preferably 0.05 to 1 part by weight, per 100 parts by weight of the polyolefin resin.

The organic nucleating agent composition preferable for the invention can be blended into the polyolefin resin by an arbitrary known blending means, and the blend prepared in a high concentration can be used as a masterbatch resin.

In the organic nucleating agent composition preferable for the invention, it is important that the surface of the solid particles of the dibenzylidenesorbitol derivative is coated with the higher fatty acid, and the aforementioned effects cannot be obtained by mere blending of the dibenzylidene sorbitol derivative and the higher fatty acid.

Moreover, unless a heat history of not less than 190° C., preferably not less than 200° is experienced, the aforementioned effect cannot be achieved sufficiently. The heat history is sufficient by once. For example, the polyolefin resin composition is blended with 0.01 to 2 wt. % of the above di-substituted benzylidenesorbitol composition, and pelletized with heating at a temperature not less than 200° C. The pellets are used for molding container for a photographic film. In such a case, even when the molding resin temperature is not more than 180° C., the aforementioned effects are obtained. However, by rendering the molding resin temperature not less than 180° C. (i.e. twice heat history of not less than 180° C.), the molded container for a photographic film is very excellent in transparency, physical properties and rigidity, has a high surface gloss.

The organic nucleating agent composition preferable for the invention exhibits various advantages compared with conventional organic nucleating agent, such as not degrading various properties, such as transparency, physical strength, bleeding out problem and rigidity, but occiasionally improving the properties, being excellent in odorless property, the improvement in moldability to shorten molding cycle and the decrease of molding troubles, by blending into the polyolefin resin composition. That is, a container for a photographic film excellent in transparency, physical strength, rigidity, rare bleeding out, odorless property, shortening of molding cycle and wear resistance can be provided by blending the di-substituted benzylidenesorbitol composition into a polyolefin resin composition.

Although the reason why the organic nucleating agent composition preferable for the invention exhibits the above excellent effects is not clear, it can be considered that benzaldehyde, which is a raw material of conventional dibenzylidenesorbitol, and benzaldehyde derivatives such a p-substituted benzaldehyde, which are a raw material of the dibenzylidene sorbitol deriative of the invention, have odor, and a trace amount thereof unavoidably remains in dibenzylidenesorbitol or its derivative after purification to cause foreign odor of the container for a photographic film, and that a small amount of dibenzylidenesorbitol or its derivative is decomposed during molding the container for a photographic film to cause foreign odor. By satisfying the requirement of using the solid particles of the dibenzylidenesorbitol deriative of the aforementioned formula and coating them with the higher fatty acid of the aforementioned formula, the organic nucleating agent composition exhibits the effect of sharply decreasing the foreign odor of the molded container for a photographic film and the effect of improving the aforementioned various properties, such as rigidity, transparency and physical strength. Particularly, in the case of using carbon black as a light-shielding material, foreign odor becomes almost none, and degradation of photographic properties is very rare, which may be caused by the adsorption of benzaldehydes on carbon black.

Various organic nucleating agent may be used as a single material, a combination with various inorganic nucleating agent or a combination of two or more organic nucleating agent. The surface of organic nucleating agent may be coated with various lubricant, such as fatty acid, fatty acid compound or silicone, coupling agent, plasticizer, dispersing agent such as surfactant, wetting agent or the like. Particularly, deodorizing and preventing photographic properties degradation exhibit by combining a material having a function to adsorb benzaldehydes such as carbon black as a light-shielding material.

A suitable blending amount of nucleating agent is 0.01 to 2 wt. %, preferably 0.05 to 1 wt. %, particularly preferably 0.07 to 0.5 wt. %. When the blending amount is less than 0.01 wt. %, the blending effects is insufficient. When the blending amount exceeds 2 wt. %, the effect of the excess amount of the nucleating agent is minor. According to the kind of the nucleating agent, it adversely affects photographic film, generates noxious odor, adheres to mold, bleeds out, decreases dropping strength, or the like.

As the method of blending the nucleating agent, there are the compound method, the dry blending method, the masterbatch method, and the like, and the masterbatch method is preferred because of excellent workability and less contamination of evironment. Since the nucleating agent is bulky and tends to fly away, to blend a small amout of dispersing agent or wetting agent is preferred. Suitable dispersing agents include various lubricants, various waxes, various carboxylic acid arthydrides, various higher fatty acids, etc., and lubricants such as various fatty acid metal salts, various silicones and oleic amide are particularly preferred. As the wetting agent, plasticizers such as DOP and DHP can be used.

Representative examples of the plasticizer are shown below.

(1) Phthalic acid plasticizer
dibutyl phthalate, diheptyl phthalate, dioctyl phthalate, diisodecyl phthalate, butyl lauryl phthalate, ditridecyl phthalate, butyl benzyl phthalate, butyl phthalyl butyl glycolate, etc.

(2) Phosphoric acid plasticizer
tricresyl phosphate, trioctyl phosphate, etc.

(3) Fatty acid plasticizer
tri-n-butyl citrate, dioctyl adipate, dioctyl azelate, dioctyl sebacate, methyl acetyl ricinoleate, etc.

(4) Epoxy plasticizer
alkyl epoxy stearate, 4,5-epoxytetrahydrodiisodecyl phthalate, etc.

(5) Other plasticizer
chlorinated paraffin, polyester, sucrose octacetate, etc.

A suitable blending amount of the plasticizer is 0.01 to 10 wt. %, preferably 0.05 to 7 wt. %, particularly preferably 0.1 to 5 wt. %. When the blending amount is less than 0.01 wt. %, the blending effects on the improvement in the uniform dispersibility of light-shielding material and in the blocking adhesion are insufficient. When the blending amount exceeds 10 wt. %, screw slip occurs in an extruder resulting in the variation of ejected resin amount.

Besides, it is preferable that the surface of organic nucleating agent is coated or blended with a fatty acid or a fatty acid compound, such as higher fatty acid, fatty acid amide or fatty acid metal salt, to improve dispersion and to prevent bleeding out. Furthermore, it is preferable to use in a form of pellets produced by kneading with a polyolefin resin at a temperature not less than 180° C., preferably not less than 190° C., particularly preferably not less than 200° C. so as to experience heat history, in view exercising the effects of nucleating agent sufficiently. That is, by blending the above additives, various effects can be obtained, such as the improvement in physical strength, the decrease of white powder generation by abrasion due to great rigidity, and the decrease of white powder generation by crystallization or bleeding out of organic nucleating agent. Furthermore, noxious odor of organic nucleating agent can be prevented, and the prevention of static electricity generation and the prevention of blocking can be improved. In the invention, the effect of organic nucleating agent and uniform dispersibility of light-shielding material can be achieved by imparting a heat history of twice or more at 120° to 400° C., particularly three times or more at 140° to 350° C.

The container for a photographic film of the invention can be blended with various additives of which the kind and amount are selected so as not to affect photographic properties adversely according to the required properties and the object of use. Details of these additives are disclosed in "Plastic Data landbook" published by Kogyo Chosa-Kai on Jul. 5, 1980 and the like.

To the container for a photographic film of the invention, light-shielding material may be added in order to improve printability, prevention of temperature elevation in the container, rigidity, moldability, dripproofness, light-shielding ability (opacity), physical strength, particularly dropping impact strength or the like.

Representative examples of the light-shielding material are shown below.

Inorganic Compounds:

Oxides . . . Silica, diatomaceous earth, alumina, titaniumu oxide, iron oxide, zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass baloon, glass bead, calcium silicate, montomorillonite, bentonite, zeolite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Organic Compounds: wood flour such as pine, oak and sadust, husk fiber such as almond, peanut and chaff, colored various fibers such as cotton, jute, paper piece, cellophane piece, nylon fiber, polypropylene fiber, various starch (containing modified starch, surface-treated starch, etc.), aromatic polyamide fiber, etc.

Among them, inorganic compounds rendering opaque are preferable, and carbon black, titanium nitride and graphite which are light-absorptive light-shielding material are particularly preferred, since they are excellent in light-shielding ability, antistatic properties, antiblocking ability, the improvement in physical strength, oxidation inhibition, heat resistance and light resistance and are relatively inactive materials.

Carbon blacks are divided into gas black, oil furnace black, channel black, anthracene black, acetylene black, Ketchen carbon black, thermal black, lamp black, vegetable black and animal black according to their origin. Among these, oil furnace carbon black is prefeable in terms of photographic properties, light-shielding character, cost and improvement of properties. On the other hand, since acetylene black and Ketschen carbon black which is modified by-prodeced carbon black have an antistatic character, they are alsoi preferable, though they are expensive. They may be blended to the oil furnace black in order to improve its character.

Particularly preferable carbon black has a pH (JIS K 6221) of 4 to 9, preferably pH 6 to 8, a mean particle size measured by microscopy of 10 to 120 mµ, preferably 15 to 60 my, a volatile components content (JIS K 6221) of less than 3.0%, preferably less than 1.0%, and an oil absorption value (JIS K 6221) of more than 60 ml/100 g, preferably more than 70 ml/100 g, because of no degradation of photographic properties, such as fogging and sensitivity deviation, and no occurrence of foaming, silver streaks, etc. troubles, excellent dispersibility and rare occurrence of microgrits (agglomerates of impurities).

So as not to adversely affect photographic properties of photographic film, the carbon black has a free sulfur content of not more than 0.6%, preferably not more than 0.3%, particularly preferably not more than 0.1%, a cyanogen compound content of not more than 0.01%, preferably not more than 0.005%, particularly preferably not more than 0.001%, and an aidehyde compound content of not more than 0.1%, preferably not more than 0.05%, particularly preferably not more than 0.01%. It is necessary to take care of these substances, because they adversely affect photographic properties even in a very small amount.

As the representative blending methods of carbon black, there are dry coloring, paste color, wet coloring, masterbatch pellets, powder dye, pigment coloring, compound color pellets and the like.

The compound method is of using uniformly colored resin pellets having the same density as the color density of a molded article. The masterbatch method is of preparing color masterbatch pellets containing the light-shielding material in a content of about 20 wt.%, blending the color masterbatch pellets with uncolored resin pellets at a ratio so as to become the color density of a molded article, and using the blend or pellets.

Among the above blending methods, the masterbatch method is preferred because of reducing the material cost by 25% or more and less contamiration of the working place. In the masterbatch method, a tumbling mixer, an automatic color mixer (a machine for mixing color masterbatch pellets and uncolored resin pellets uniformly), a static mixer, a super nozzle (an apparatus for rendering molten resin color uniform), etc. are unilized. The resin for masterbatch pellets preferably contains ethylene copolymer resin and/or low softening point (not lower than 100° C.) thermoplastic resin (e.g. paraffin wax, low molecular weight polyethylene resin, low molecular weight polypropylene resin, etc.) in an amount of not less than 50 wt. %. Japanese Patent KOKOKU No. 40-26196 discloses a method of making a masterbatch of polymer-carbon black by dissolving the polymer in an organic solvent and dispersing the carbon black into the solution. Japanese Patent KOKOKU No. 43-10362 discloses another method of making a masterbatch by dispersing the carbon black into polyethylene. The inventor also disclosed a resin composition for color masterbatch (EP 0,277,598A).

As the preferable light-shielding materials, inorganic pigments having a refraction index measured by the Larsen oil immersion test of not less than 1.50, various metal powders, metal flakes, metal pastes, metal fibers, and carbon fiber are next to carbon black. Representative examples are titanium oxide in rutile type (2.76), titanium oxide in anatase type (2.52), zinc oxide (2.37), antimony oxide (2.35), lead white (2.09), zinc white (2.02), lithopone (1.84), carbon black (1.61), baryta powder (1.64), barium sulfate (1.64), calcium carbonate (1.58), talc (1.58), calcium sulfate (1.56), silicic anhydride (1.55), silica powder (1.54), magnesium hydroxide (1.54), basic magnesium carbonate (1.52), alumina (1.50), and the like. Particularly preferable light-shielding materials have a refraction index of not less than 1.55, more preferably not less than 1.60. The number in parenthesis indicates refraction index. On the other hand, calcium silicate (1.46), diatomaseous earth (1.45), hydrous silicate (1.44) and the like having a refraction index of less than 1.50, they are unsuitable, because of small light-shielding ability and tendency to generate microgrits (aggromerated of impurities). As the representative examples of metal powder, including metal paste, there are aluminum powder, copper powder, stainless steel powder, iron powder, silver powder, tin powder, zinc powder, steel powder, etc., and aluminum powder and aluminum paste are particularly preferable.

A suitable blending amount of the light-shielding material is 0.01 to 40 wt. %, preferably 0.05 to 30 wt. %, particularly preferably 0.1 to 20 wt. %. When the blending amount is less than 0.01 wt. %, the blending effect does not exhibit. On the other hand, when the blending amount exceeds 40 wt. %, physical strength, particularly dropping impact strength, greatly decreases, weld lines strongly occur and appearance is degraded.

It is preferable that the surface of light-shielding material is coated in order to improve dispersibility of the light-shielding material, to prevent the occurrence of lumps and to prevent fouling of mold surface.

Suitable materials for coating the surface of light-shielding material. are those capable of coating easily and preventing aggregation of the light-shielding material, and include various waxes, acid-modified thermoplastic resins including the aforementioned adhesive polyolefin resins. Acid-modified polyolefin resins, ethylene-acrylate ester copolymer resin and ethylene-vinyl acetate copolymer resin are preferable. Among the acid-modified polyolefin resins, particularly preferred ones have a low Vicat softening point, preferably not more than 100° C., particularly preferably not more than 90° C., and a melt flow rate of not less than 1 g/10 minutes, preferably not less than 5 g/10 minutes, particularly preferably not less than 8 g/10 minutes. The above acid-modified polyolefin resin is a polyolefin resin modified by grafting unsaturated carboxylic acid, unsaturated carboxylic acid derivative or the like. Low molecular weight polyolefin resins are also preferable, and it is preferable to use poly-ethylene wax (homopolyethylene wax, ethylene-α-olefin wax) or polypropylene wax as a single material or a blend with a thermoplastic resin or the following material. Various lubricants, surfactants and antistatic agents, which are mentioned previously, plasticizers, coupling agents, etc. are also preferable because of improving the dispersibility of light-shielding material, moldability, surface smoothness, slipping character, antistatic properties, preventing the occurrence of lumps, and improving packaging processibility of photographic film, and capable of blending lubricant, surfactant, antistatic agent and plasticizer which tend to bleed out in a state adsorbed on or reacting with the light-shielding material.

Representative coating by the surface-coating material are as follows:

(1) Using a coupling agent:
   Coated with a coupling agent containing azidosilane compound (disclosed in Japanese Patent KOKAI No. 62-32125).
   Coated with a silane coupling agent (aminosilane etc.).
   Coated with a titanate coupling agent.
(2) Coated by depositing silica followed by depositing by alumina.
(3) Coated with higher fatty acid metal salt, such as zinc stearate, magnesium stearate or calcium stearate.
(4) Coated with surfactant, such as sodium stearate, potassium stearate or hydroxyethylene dodecylamine.
(5) Coated by reacting barium sulfide aqueous solution with sulfuric acid aqueous solution in the presence of an excess amount of barium ion to produce barium sulfate having a mean particle size of 0.1 to 2.5 µm, adding alkaline silicic acid solution thereto to deposit barium silicate on the surface of the barium sulfate, and depositing hydrous silica on the surface of the barium sulfate produced by the decomposition of the barium silicate by adding mineral acid to the slurry.
(6) Coated with a composition consisting of one or more of the oxides selected from hydrated oxides of metal, such as titanium, aluminum, cerium, zinc, iron, cobalt or silicon, and oxides of metal., such as titanium, aluminum, cerium, zinc, iron, cobalt or silicon.
(7) Coated with a polymer having one or more reactive groups selected from aziridine group, oxiazoline group and N-hydroxyalkylamide group.
(8) Coated with polyoxyalkylene amid compound.
(9) Coated with cerium iron, selected acid amion and alumina.
(10) Coated with alkoxy titanium derivative having α-hydroxycarboxylic acid residue as substituent.
(11) Coated with polytetrafluoroethylene.
(12) Coated with polydimethylsiloxane or modified silicone.
(13) Coated with phosphate ester compound.
(14) Coated with divalent to tetravalent alcohol.
(15) Coated with olefin wax, such as polyethylene wax or polypropylene wax.
(16) Coated with hydrous aluminum oxide.
(17) Coated with silca if zubc compound consisting of zinc chloride, zinc hydroxide, zinc oxide, zinc sulfate, zinc nitrate, zinc acetate or zinc citrate of a combination thereof.
(18) Coated with polyhydroxy saturated hydrocarbon. Others.

A suitable coating amount is 0.001 to 5 wt. %, preferably 0.01 to 3 wt. %, particularly preferably 0.05 to 1.5 wt. %, against light-shielding material.

The followings are representative examples preferable as the surface coating of light-reflective light-shielding materials of white pigment (titanium dioxide, calcium carbonate, etc.).

Coated with divalent to quadrivalent alcohols having a number of carbon atoms of 2 to 18, preferably 2 to 6. Examples of dihydric alcohol are ethylene glycol, propylene glycol, pentamethylene glycol, heptamethylene glycol, dodecamethylene glycol, 1,3-dihydroxybutane, 1,4-dihydroxybutane, 2,5-dihydroxyhexane and 2,4-dihydroxy-2-methylpentene, and examples of trihydric alcohol are trimethylolethane, trimethylolpropane and glyceine. An example of tetrahydric alcohol is pentaerithritol. Preferable polyoles have a number of carbon atoms of 4 to 5 and three methylol group and have four methylol groups, and trimethylolethane and pentaerithritol are particularly preferred. A suitable coating amount of polyol is 0.001 to 20 wt. %, preferably 0.005 to 10 wt. %, particularly preferably 0.01 to 5 wt. %, of light-shielding material. To combine polyol with lubricant is preferable because of improving various properties simultaneously, such as moldability, slipping character, the prevention of white powder generation by bleeding out, packaging processibility and the like.

The surface of the light-shielding material can be coated with the polyol by the method of immersing the light-shielding material is polyol dissolved in a solvent and then evaporating the solvent to dryness, by the method of spraying polyol dissolved in a solvent to the light-shielding material and then removing the solvent to dryness, by the method of melting polyol and kneading with the light-shielding material or the like. A particularly preferable method is of kneading the light-shielding material with polyol and then grinding. As a means therefor, polyol is added upon grinding the light-shielding material by a fluid energy pulverizer, such as micronizer or jet mill, to coat the surface of the light-shielding material by using a high shearing force blender, such as Henschel mixer or super mixer, to coat the surface of the light-shielding material, or the like.

It is preferable to coat the surface of the light-shielding material with ethylene copolymer resin, acid-modifide resin, maleic anhydride copolymer resin, low Vicat softening point resin of not more than 100° C., paraffin wax, polyethylene wax, polypropylene wax or the like by kneading with temperature and high shearing force.

Various lubricants, various surfactants, various antistatic agents, various dripproofing agents can be coated on the surface of the light-shielding mterial by the method similar to the above polyol.

Antistatic agent applicable to the invention includes:

A suitable blending amount of the antistatic agent is 0.01 to 5 wt. %, preferably 0.05 to 3 wt. %, particularly preferably 0.1 to 2 wt. %.

Nonionic Antistatic Agent:
Alkylamine derivatives:

Polyoxyethylene alkyl amine, tertiary amine e.g. laurylamine, N,N-bis(2-hydroxyethyl cocoamine, N-hydroxyhexadecyl-di-ethanolamine, N-hydroxyoctadecyl-di-ethanolamine, etc.

Fatty amide derivatives:

Oxalic acid-N,N'-distearylamide bytyl ester, polyoxyethylene alkyl amide, etc.

Ethers:

Polyoxyethylene alkyl ether, polyoxyethylene alkyl phenyl ether, etc.

Polyol esters:

Glycerine fatty acid esters, sorbitan fatty acid esters, 1-hydroxyethyl-2-dodecylglyoxazoline, etc.

Anionic Antistatic Agent:

Sulfonates:

Alkyl fulfonate ($RSO_3Na$), alkylbenzene sulfonate, alkyl sulfate ($ROSO_3Na$), etc.

Phosphate esters:

Alkyl phosphate, etc.

Cationic Antistatic Agent:
Cationic amides:
Quaternary ammonium salts:

Quaternary ammonium chloride, quaternary ammonium ammonium sulfate, quaternary ammonium nitrate, e.g. stearamide propyl-dimethyl-$\beta$-hydroxyethyl ammonium nitrate, etc.

Ampholytic Antistatic Agent:
Alkyl betaines:
Imidaxolines:
Alkyl imidazolines:
Metal salts:

$(RNR'CH_2CH_2CH_2NCH_2COO)_2$ Mg ($R \geq C$, $R'=H$ or $(CH_2)_m$ COO—, etc.

Alkyl alanines:
Conductive resin:

Polyvinylvenzyl cation, polycrylic acid cation, etc.

Among them, nonionic antistatic agents are particularly preferred, because adverse affect upon photographic properties and human body is small.

As the internal antistatic agent for the inside, whichever of nonionic antistatic agent, anionic antistatic agent or ampholytic antistatic agent may be used. Effective nonionic antistatic agents are ethylene oxide adducts of higher alcohol, ethylene oxide adducts of alkyl phenol, esters, such as esters of higher fatty acid and polyol, polyethylene glycol esters of higher fatty acid, polyethers, amides, such as higher fatty amides, dialkyl amides and ethylene oxide adducts of higher fatty amide. Effective anionic antistatic agents are alkyl allylphosphonic acids, adipic acid, glutamic acid, alkyl sulfonic acid salts, alkyl sulfates, polyoxyethylene alkylphosphates, fatty acid salts, alkyl benzene sulfonates, alkyl naphthalene sulfonates, and sodium dialkyl sulfosuccinates. As to cationic antistatic agent, amines, such as alkyl amine phosphates, Schiff's base, amide amines, polyethylene imines, complexes of amide amine and metal salt and alkyl esters of amino acid, imidazolines, amine-ethyleneoxide adducts and quaternary ammonium salts are suitable. As to ampholytic antistatic agent, N-acylsarcosinate, amino carboxylic acid esters, alaninemetal salts, imidazoline metal salts, carboxylic acid metal salts, dicarboxylic acid metal salts, diamine metal salts, metal salts having ethylene oxide groups, and the like are suitable. As to the other antistatic materials, inorganic electrolytes, metal powders, metal oxides, kaolin, silicates, carbon powder and carbon fiber also exercise the effect of the invention. Besides, graft polymers and polymer blends are also effective.

As to the external antistatic agent for the outside, nonionic antistatic agent includes polyols, such as glycerine, sorbit, polyethylene glycol and polyethylene oxide, polyol esters, higher alcohol-ethylene oxide adducts, alkylphenol-ethylene oxide adducts, fatty acid-ethylene oxide adducts, amides, amide-ethylene oxide adducts and amine-ethylene oxide adducts. Ampholytic antistatic agent includes carboxylic acids, such as alkylalanines, and sulfonic acids. As anionic antistatic agent, carboxylic acid salts, sulfuric acid derivatives, such as alkyl sulfonates, phosphoric acid derivatives, such as phosphonic acid, phosphate esters, and polyester derivatives are suitable. As cationic antistatic agent, amines, such as alkylamines, amido amines and ester amines, vinyl nitrogen derivatives, quaternary ammonium salts, such as ammonium salts containing amide group and ammonium salts containing ethylene oxide, acrylic acid ester derivatives, acrylic amide derivatives, vinyl ether derivatives, and the like are suitable.

When antistatic agent, dripproofing agent or light-shielding material is blended into the container for a photographic film, a surfactant may be added in order to improve the dispersibility of the light-shielding material, slipping character, the prevention of white powder generation by bleeding out, etc.

Examples of the surfactant are shown below. Nonionic surfactants (representative component: polyoxyethylene glycol compound):

Polyethyleneglycol fatty acid ester, polyoxyethylene sorbitan fatty acid ester, polyoxyethylene fatty alcohol ester, polyoxyethylene glycerine fatty acid ester, polyoxyethylene fatty amine, sorbitan monofatty acid ester, fatty acid pentaerythritol, fatty alcohol-ethylene oxide adduct, fatty acid-ethylene oxide adduct, fatty amino acid or fatty amide-ethylene oxide adduct, alkyl phenol.-ethylene oxide adduct, alkyl naphthol-ethylene oxide adduct, partial fatty ester of polyol-ethylene oxide adduct, various other nonionic antioxidants disclosed in Japanese Patent KOKOKU No. 63-26697, etc.

Anionic surfactants (respresentative component: polyoxyethylene glycol compound):

Sodium salt of ricinoleic acid sulfate ester, various fatty acid metal salts, sodium salt of ricinoleate ester sulfate ester, sulfated oleic acid ethylaniline, sulfate ester salt of olefin, sodium salt of oleil alcohol sulfate ester, alkyl sulfate ester salt, fatty acid ethyl sulfonic acid salt, alkyl sulfonic acid salt, alkyl naphthalene sulfonic acid salt, alkyl benzene sulfonic acid salt, succinic acid ester sulfonic acid salt, phosphate ester salt, etc.

Cationic surfactants (representative component: quaternary ammonium salt):

Primary amine salts, tertiary amine salts, quaternary ammonium salts, pyridine derivatives, Amphoretic surfactants:

Carboxylic acid derivatives, imidazoline derivatives, betaine derivatives.

The container for a photographic film of the invention may be blended with either of water-absorptive or hygroscopic substance or dripproofing agent in order to prevent the generation of water drops formed on the inside and outside of the container upon temperature and humidity charge (including to prevent devitrification by the adbesion of water drops in the case of transparent containers).

The dripproofing agent includes any substance which renders a contact angle of pure water of not more than 50 degrees, preferably not more than 45 degrees, particularly preferably not more than 35 degrees, with the photographic film container containing 0.01 to 3 wt. % of the substance.

The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, palmitate monoglyceride, oleate monoglyceride, laurate monoglyceride, polyoxyethylene nonylphenyl ether, sorbitan sesquipoalmitate, diglycerine sesquioleate, sorbitol fatty acid ester, sorbitol fatty acid dibasic acid ester, diglycerine fatty acid dibasic acid ester, glycerine fatty acid debasic acid ester, sorbitan fatty acid dibasic acid ester, sorbitan palmitate, sorbitan stearate, sorbitan palmitate propylene oxide 3 moles adduct, sorbitan palmitate propylene oxide 2 moles adduct, sorbitol stearate, sorbitol stearate ethylene oxide 3 moles adduct, diglycerine palmitate, glycerine palmitate, glycerine palmitate ethylene oxide 2 moles adduct, etc.

The water-absorptive or hygroscopic substance is a hydrophilic polymer or water-absorptive polymer having a hydrophilic group which is a polar group or ionic group, e.g. hydrooxyl group, carbonyl group, carboxyl group, amino group, amide group, imide group and sulfonyl group, connected to polymer chain or side chain. Examples of the water-absorptive or hygroscopic substances are polyvinyl alcohol, starch, surface-treated starch, modified starch, starch-acrylonitrile hydrolyzate, oxide of vinyl acetate-methyl acrylate copolymer, crosslinked polyacrylamide, polyacrylamide-acrylic acid copolymer, polyacrylic acid-diacrylate copolymer, polyethylene oxide, polyvinyl pyrrolidone, crosslinked polyvinyl alcohol, polyethylene glycol, etc.

The dripproofing agent, the water-absorptive substance and the hygroscopic substance may be combined.

A suitable blending amount of the above dripproofing substance is 0.01 to 5 wt. %, preferably 0.1 to 3 wt. %, particulrly preferably 0.5 to 2 wt. %.

Preferable embodiments of the container body in cap separated from body type and body-cap joined type for a photographic film are enumerated below.

(1) Container body formed by injection molding using polypropylene resin composed of a thermoplastic resin having a propylene unit content of more than 50 wt. %, a MFR (ASTM D-1238 L conditioni of 10 to 80 g/10 minutes, a bending elastic modulus (ASTM D-790) of not less than 7,000 kg/cm$^2$ and a notched Izod impact strength (ASTM D-256) at 23° C. of not less than 2.0 kg.cm/cm.

(2) Container body comprising 50 to 95 wt. % of propylene-ethylene random copolymer resin, 5 to 50 wt. % of homopolypropylene resin and/or propylene-ethylene block copolymer resin, 0.001 to 2 wt. % of nucleating agent, 0.001 to 5 wt. % of lubricating material.

(3) Container body comprising not less than 50 wt. % of polyolefin resin, dripproofing material having dripproof action or antifog action and lubricant.

(4) Container body comprising 50 to 95 wt. % of polypropylene resin having a MFR (ASTM D-1238 L condition) of 8 to 80 g/10 minutes, a notched Izod impact strength at 23° C. of not less than 1.5 kg.cm/cm, a bending elastic modulus of not less than 7,000 kg/cm$^2$, 4 to 50 wt % of ethylene-α-olefin copolymer resin and 0.001 to 5 wt. % of lubricating material.

(5) Container body comprising not less than 60 wt. % of homopolyethylene resin and/or ethylene-α-olefin copolymer resin having a MFR (ASTM D-1238 E condition) of 5 to 50 g/10 minutes, a density (ASTM D-1505) of 0.941 to 0.985 g/cm$^3$ an Olsen rigidity (ASTM D-747) of not less than 6,000 kg/cm$^2$ Shore hardness (ASTM D-2240) of not less than 60D and a notched Izod impact strength (ASTM D-256) of not less than 2.0 kg.cm/cm. The container body may be formed of the above homopolyethylene resin alone, or ethylene-α-olefin copolymer resin alone of which the -olefin has a number of carbon atoms of 3–10, or the above properties may be obtained by blending various additives.

(6) Container body comprising not less than 60 wt. % of polystyrene resin containing synthetic rubber having a MFR (ASTM D-1238 G condition) of 5 to 50 g/10 minutes, a density (ASTM D-1505) of 0.95 to 1.2 g/cm$^3$, a bending elastic modulus (ASTM D-790) of not less than 11,000 kg/cm$^2$, a notched Izod impact strength (ASTM D-256) of not less than 2 kg.cm/cm, a Vicat softening point (ASTM D-1525) of not less than 95° C. and a Rockwell hardness (ASTM D-785 L scale) of not less than 60 L.

(7) Container body of the above (1) to (6) further comprising 0.001 to 30 wt. % of light-shielding material, particularly light-reflective light-shielding material, such as white pigment, metal powder or light yellow pigment. Printability, light-shielding heat insulating, etc. are improved, and whitening is made inconspicuouis. In the case of blending not more than 3 wt. %, dripping strength is improved. It is preferable that light-shielding material is blended in a form of masterbatch prepared by blending the light-shielding material in a high concentration (not less than 5 wt. %, preferably not less than 10 wt. %, particularly preferably not less tahn 20 wt. %) into ethylene copolymer resin. In the case of using carbon black, various advatages are obtained, such as improvement in dropping strength, slipping character and resistance to oxidation, shielding of resin yellowing, improvement in light-shielding, etc.

The container for a photographic fim of the invention can be made in the following forms.

Body-Cap Joined Type:

Recycling is possible by repelletizing because of indentical resin composition. Decorated casket can be omitted. Various thermoplastic resin compositions are usable. Polygonal (square hexagonal, octagonal) cylinder, circular cylinder, elliptical cylinder, etc.

Cap Separated from Body Type:

Excellent in multi-cavity molding ability. Molding cycle can be shortened. Mold is inexpensive. When the same resin composition is used for the body and cap, recycling is possible but sealability is inferior. When different resin compositions are used for the body and the cap, sealability and openability are excellent. Conveying properties and stock ability are also excellent.

When different resin compositions are used for the body and the cap, the body can be separated from the cap by flotation by making the specific gravity difference between the body and the cap not less than 0.1 g/cm³ preferably not less than 0.2 g/cm , particularly preferably not less than 0.3 g/cm³ and thereby recycling becomes possible. A means for increasing the specific gravity difference is to blend a pigment. After separation, respective ones can be used again by repelletizing. When L-LDPE resin is used for the cap and a resin composition containing not less than 60 wt. % of homopolypropylene resin, propylene-α-olefin copolymer resin or homopolyethylene resin or ethylene-α-olefin copolymer resin having a density (ASTM D-1505) of not less than 0.94 g/cm³ is used for the body, the mixture of the cap and the body can be used again as the resin for the body.

(8) Both of the container body and cap are formed of a polyolefin resin (particularly, containing not less than 70 wt. % of homopolyethylene resin and/or ethylene-α-olefin copolymer resin having a density (ASTM D-1505) of not less than 0.935 g/cm³, propylene-α-olefin copolymer resin) and at least one of antistatic agent, surfactant, dripproofing agent and lubricant, and the outer surface is roughened at a height (depth) of not less than 0.001 µm. The container body and cap are transported pneumatically using a pipe made of polyolefin (particularly, it is preferable to contain at least one of antistatic agent, surfactant, lubricant and carbon black, and the most preferable one contains not less than 50 wt. % of high density polyethylene resin containing these additives.). By rendering as above, various advantages can be obtained, such a excellent durability, to prevent the generation of abration dust, excellent mass transportation, to prevent the contamination by substances which adversely affect photographic properties.

Preferred relationships between the contained body and the cap are as follows:

(1) Sealability, fitting strength, openability and handling can be made excellent by making the container body highly rigid and the cap flexible. A suitable bending rigidity ratio of the resin of the container body/the resin of the cap is not less than 1.5, preferably not less than 2, particularly preferably not less than 3.

(2) Although resin having a small bending rigidity is used as the resin of the container body, sealability can be improved by thickening the bottom or providing reinforcing ribs, increasing pressure resistance and by using resin having a greater bending rigidity than the resin of the container body (the outer diameter of the fitting part of the cap is made greater than the inner diameter of the container bodyi. The pressure resistance is ensured by the high rigidity cap and the bottom of the container body.

(3) Both of the container body and the cap are colored. The disadvantage that the kind of the production the container cannot be discriminated from the outside of the container because of opaqueness is resolved by setting the color of the cap and/or the container body so as to represent the product in the container.

Example:

Red cap and brown body . . . Reversal film

Green cap and grown body . . . ISO Photographic speed 100 negative film

White cap and brown body . . . Microfilm

Black cap and brown body . . . ISO Photographic speed 400 negative film

Black cap and black body . . . ISO Photographic speed 800 negative film

Silver cap and silver body . . . ISO Photographic speed 1600 negative film

Using a resin composition having X-ray-shielding ability (4) The same resin composition is used for the container body and the cap. Recycling is possible. Body-cap joined type ispreferred.

(5) The container body can be separated from the cap during washing by the specific gravity difference by making it not less than 0.1 , preferably not less than 0.2, particularly preferably not less than 0.3. Recycling is possible. The specific gravity difference is added by selecting the kind of resin, using a high specific gravity pigment or metal powder or the like.

As the form of fitting of the cap to the container body, fitting rib may be formed on whichever of the cap or the container body, and the form of the rib and fitting gloove may be varied.

In the container for a photographic film produced according to the process of the invention, it is preferable to form a roughened face 0.001 to 10 µm, particularly 0.005 to 5 µm, in height of roughness on the inner peripheral wall portion of the container body. By forming the roughened face, the occurrence of deformation can be prevented due to the evacuation from the container body upon extracting the mold core therefrom during injection molding.

The form of the roughness is composed of many lateral fine ribs formed in the circumferential direction, many longitudinal fine ribs formed in the axial. direction, lattice fine ribs form, silk cloth finish form, aventurine finish form, or the like. The form of the roughness many be anyone capable of preventing to form a reduced pressure in the container body at the time of extracting the core therefrom.

A suitable height of fine ribs is 0.001 to 10 um, preferably 0.005 to 5 um, particularly preferably 0.01 to 2.5 um. When the height is smaller than 0.001 um, bursting sound is great, and buckling, bottom sink mark and the like are liable to occur. When the height is greater than 10 um, impact strength greatly decreases, and transparency degrades. Moreover, slipping character is inferior, and abrasion powder is liable to generate.

As a method of forming the roughened face, in the case of the inner surface of the peripheral wall portion of the container body, indentations are formed on the surface of the core mold (male mold), by the sandblasting method, the etching method, the engraving method, the grinding method or the like. In the case of the outer surface of the peripheral wall portion of the container body, indentations are formed on the surface of the cavity (female mold) by the method similar to the core mold. In order to form very fine indentations as above, it is preferable that the surface of the core mold is once formed into a smooth surface, and then the indentations are formed thereon by using a grinding paper, grinding cloth or the like. When many lateral fine glooves are formed in the circumferential direction, grinding paper, grinding cloth or the like is pressed to the peripheral surface of the core mold in a form of cylinder including circular cylinder and elliptic cylinder or prism including square cylinder and polygonal cylinder, and then the core is rotated. Alternatively, the grinding paper, grinding cloth or the like may be moved on the surface of the core which is fixed in the circumferential direction. When many longitudinal fine grooves are formed in the axial direction, the grooves can be formed easily by changing the movement in the above circumferential direction to the movement in the axial direction. When lattice fine grooves are formed, the grooves can be formed easily by combining the movement in the above circumferential direction and the movement in the axial direction. The movement may be in an oblique direction, or the like.

A suitable mold for forming the container for a photographic film has the gate at almost the center of the lower part of the container body, is composed of a female mold (cavity) of which the outer surface is made a roughened face with a depth of 0.001 to 10 µm and a male mold (core) of which the inner surface is made roughened face with a depth of 0.001 to 10 µm, has a cavity 0.4 to 1.2 mm in width therebetween, and is provided with notches for vent at an end of the cavity at the split face of the mold. The form and size of the notches for vent are not particularly limited. However, it is necessary to design the notches so that the vent effect is great, and nevertheless, the trouble of escaping the molten resin from the notches (burns). Actually, a suitable notch has a mean depth of 0.001 to 5 m, preferably 0.005 to 2.5 µm, particularly preferably 0.01 to 1 µm, and a notched width of not less than 1 µm, preferably not less than 1000 µm, particularly preferably 0.5 to 5 mm, in view of the balance between the prevention of burns and the vent effect.

The container for a photographic film of the invention may be provided with various indications, such as indication of content, instructions of use, bar code and the like by printing, polacing in a packaging material with print (bag, wrapping, shrink packaging, packaging box, etc.). By placing in the packaging material, protection of the container for a photographic film of the invention is improved, and verginity of goods can be ensured. Decoration can also be added. As the packaging film, shrinkable film is preferred, and generally known shrinkable films, such as made of polyvinyl chloride, polyester, polypropylene or polyethylene, are usable. Taking recycling into consideration, the material of the shrinkable film is preferably similar to the container body and the cap.

The packaging film may be provided with a means for facilitating opening. Such a means may be an opening tape, perforations, an easily peelable portion or the like. The means for facilitating opening may be provided circumferentially or partly, at one part or polural parts.

The packaging box is preferably formed of a combination paper composed of three layers. The paper may be formed upon paper making or formed by lamination through an adhesive layer. Both surface layers of the combination paper having printability are formed of white paper made of bleached virgin pulp which may be acidic paper or neutral paper, or waste paper of fine paper. The middle layer may be formed of unattractive paper inferior in printability, such as waste paper of news paper, corrugated board or the like, high yeild pulp (frequently used for copying) unbleached or semibleached kraft paper, gray board paper, regenerated paper used in magazine, etc. The blending amount of waste paper can be up to about 60 wt. % of the combination paper. The printing face is preferably formed of a mirror-coated paper, clay-coated paper, art paper or the like, in view of attractiveness, printability, wear resistance and the like. The packaging box is also preferably provided with a means for facilitating opening, such as perforations similar to the case of wrapping film.

The container for a photographic film of the invention may be sealed by a band seal between the container body and the cap. Preferred band seals are formed of paper, synthetic paper, nonwoven fabric, plastic film, laminated-film or the like, on which the surface is printed, and a sealable adhesive, such as heat-sensitive adhesive, pressure-sensitive adhesive, hot-melt adhesive or other adhesive, is provided on the container body portion.

It is preferable tha tht econtainer for a photographic film is produced by pelelletizing the resin for forming the container, and pneumatically conveying the pellets from the container to the hopper of a molding machine in a sealed state, in view of preventing contamination with impurities, such as sand, pebble, paper fiber, dust, radioactive dust, etc. That is, by conveying the thermoplastic resin in a sealed state preventing from contamination with foreign materials (pellets transported from a resin manufacturer in a state of sealing in a container is conveyed through a pipe, provisionally stocked in a silo, and then supplied to a hopper of molding machine by an outomatic roller conveyor), continuous molding is possible without molding troubles, such as short shot or not shot, due to gate clogging.

A suitable length diameter ratio of the pellet of the resin for molding the container is 0.1 to 15, preferably 0.3 to 5. The form of the pellet may be circular cylinder, polygonal cylinder, fusiform, ellipsoid or the like.

A use of the container for a photographic film of the invention is a container for a photographic film cartridge. As the container for a photographic film cartridge, there are cap separated from body fitting type and body-cap joined fitting type. The container of the invention is particularly suitable for 135 type wherein the leading end of the photographic film is previously extended out of the cartridge which is now the spread and a type wherein the leading end is wound in the cartridge and delivered by the rotation of spool (U.S. Pat. No. 4,634,306, U.S. Pat. No. 4,832,275, Japanese Patent KOKAI No. 4-320,258, etc.). When the container for a photographic film of the invention is applied for a photographic film cartridge, the form of the cartridge may be circular cylinder, square cylinder or various other form having a spool core for winding photographic film. The material may be presently used resin. The container for a photographic film of the invention is particularly effective for relatively weak cartridges such as formed of resin, because of being excellent in impact strength and compressive strength.

The total form of the container body may be designed so as to meet the form of the photographic film cartridge placed therein, and may be cylinder including circular cylinder and elliptical cylinder, polygonal cylinder and the like.

Moreover, the container of the invention is also applicable to containers for microfilm, containers for long negative film for movie photographing wound around a core, 16 mm negative photographic films placed in a cartridge (instamatic film), brownie size films, etc.

Some containers for a photographic film embodying the invention are illustrated in FIGS. 1 through 10.

The container 1 for a photographic film of FIG. 1 is composed of a container body 2 and a cap 3, and the inner surface of the container body 2 is a toughened face 4 by forming lateral fine ribs.

Figure 2:
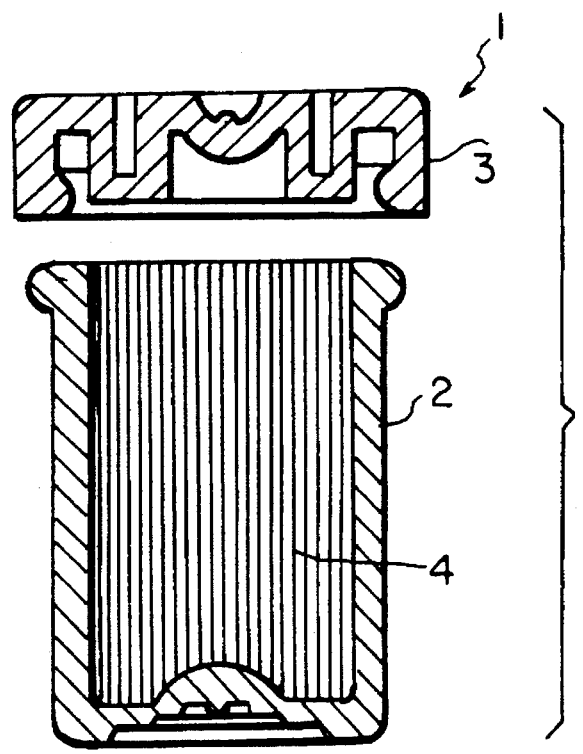

The container 1 for a photographic film of FIG. 2 is also composed of a container body 2 and a cap 3, and the inner surface of the container body 2 is a roughened face 4 by forming longitudinal fine ribs.

Figure 3:
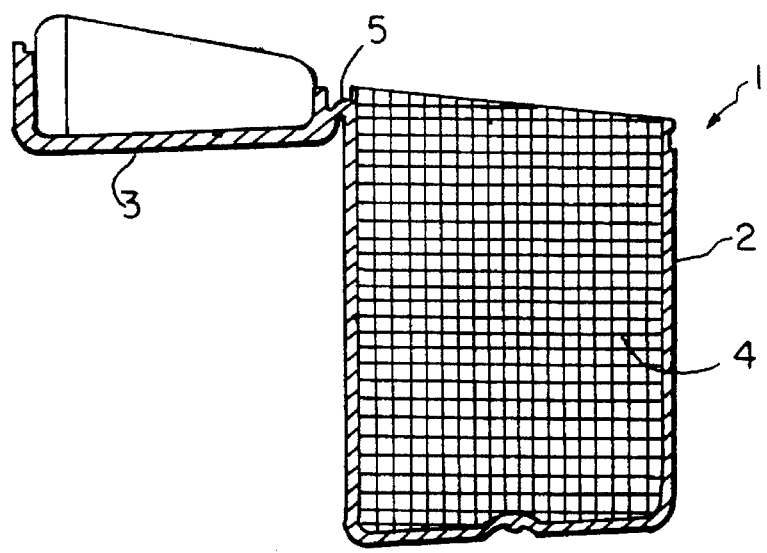

The container 1 for a photographic film of FIG. 3 is in a body-cap joined type, and the cap 3 portion is joined to the container body 2 portion throught a hinge 5. The inner surface of the container body 2 portion is a roughened face 4 by forming fine ribs in a lattice from.

Figure 4:
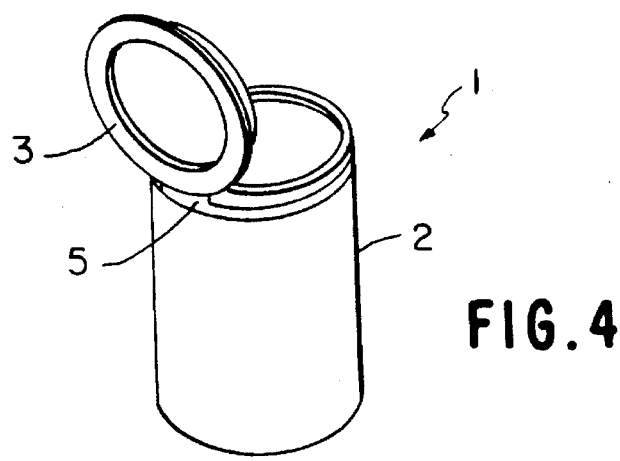
Figure 5:
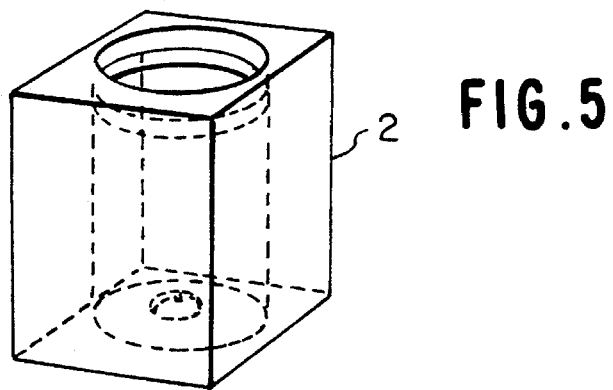
Figure 6:
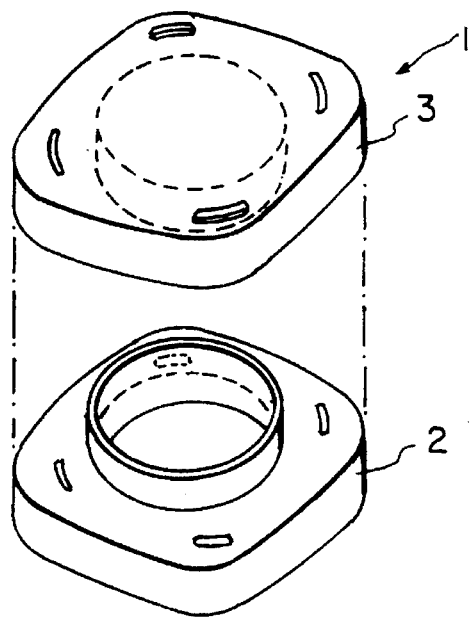
Figure 7:
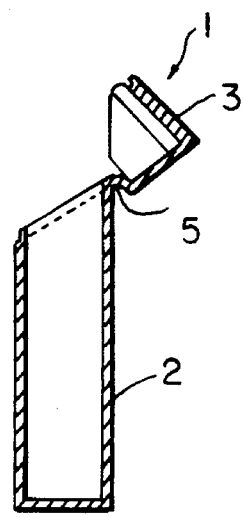
Figure 8:
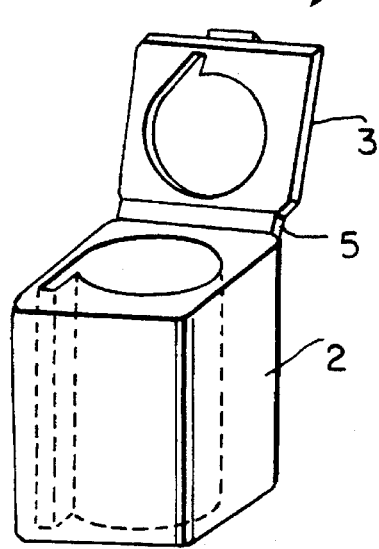

FIGS. 4 through 8 illustrates various modification of the total form of the container for a photographic film to which the present invention is applicable. The container 1 for a photographic film of FIG. 4 is formed in a circular cylinder, and the cap 3 portion is joined to the container body 2 portion through a hinge 5. in the container 1 for a photographic film of FIG. 5, the outside of the container body 2 is formed into a rectangular parallelopiped, and the inside for placing a photographic film is formed into a circular cylinder. The container 1 for a photographic film of FIG. 6 is in a fitting type of a cap 3 to a container body 2. The container 1 for a photographic film of FIG. 7 is for containing a roll of a long photographic film (microfilm), and the cap 3 portion is joined to the container body 2 portion through a hinge 5. The container 1 for a photographic film of FIG. 8 is composed of a rectangular container body 2 portion with an almost cylindeical inside and a cap 3 portion in a plate form joined thereto through a hinge 5.

Figure 9:
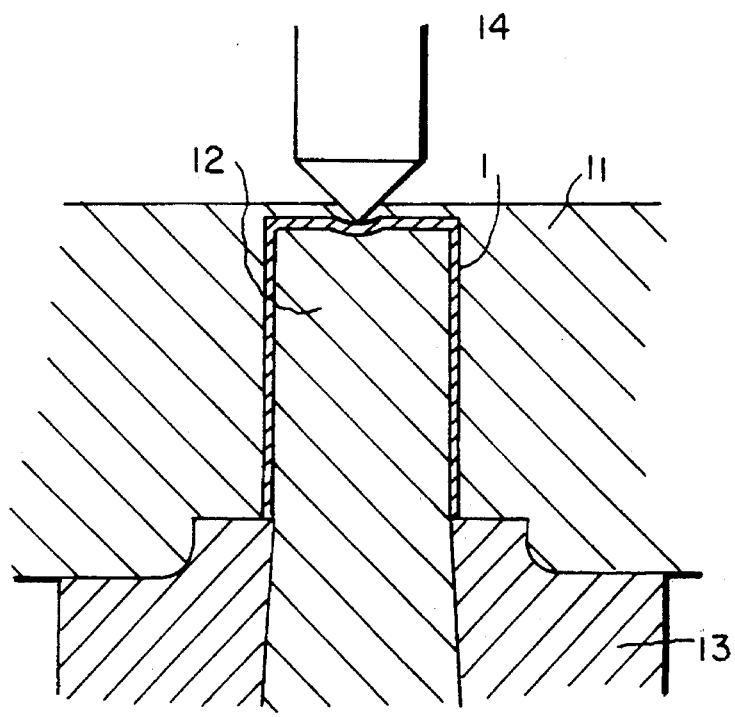
FIG. 9 is an enlarged partial sectional view of a molding apparatus for molding a container for a photographic film according to the process of the invention.
Figure 10:
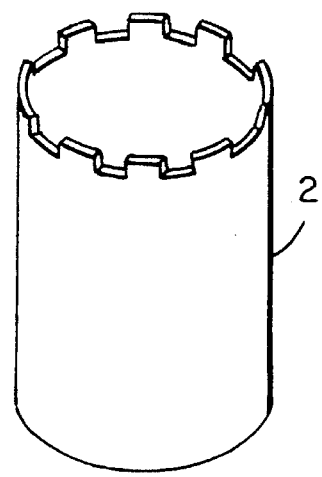
FIG. 10 is a perspective view of a container body molded by the molding apparatus shown in FIG. 9.

As essential part of a molding apparatus for molding a container body of the container for a photographic film of the invention is shown in FIG. 9. In the apparatus, a female mold 11 and a male mold 12 are integrated into a mold 13. The part of the mold 13 corresponding to the end of the container body is provided with notches so as to form notches for vent. The molten resin is injected from the nozzle 14. The container body molded by this apparatus is provided with notches in a square U form as shown in FIG. 10.

Figure 11:
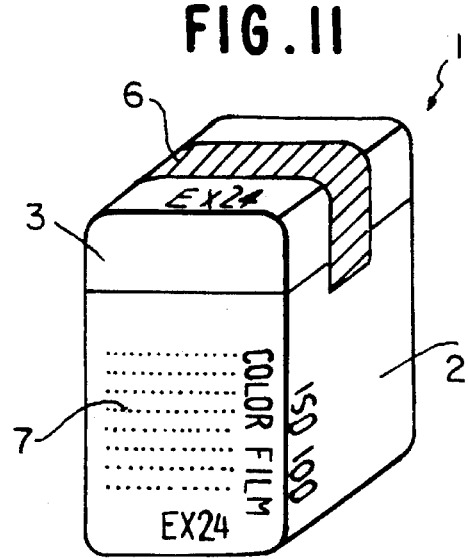
FIGS. 11 and 12 are perspective views each indicating a container for a photographic film applicable to the process of the invention.

The container 1 for a photographic film of FIG. 11 is in a body-cap joined type, and the cap 3 portion is joined to the container body 2 portion through a hindge. A sealing label 6 is attached from the cap 3 to the container body 2, and printing 7 is provided on the surface of the container body 2.

Figure 12:
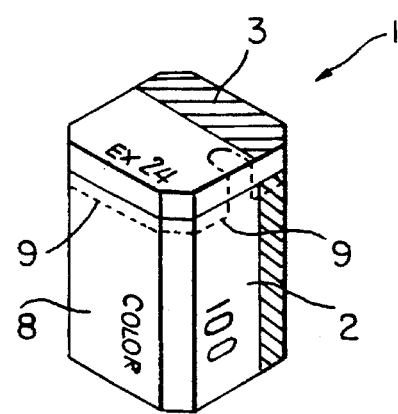
Figure 13:
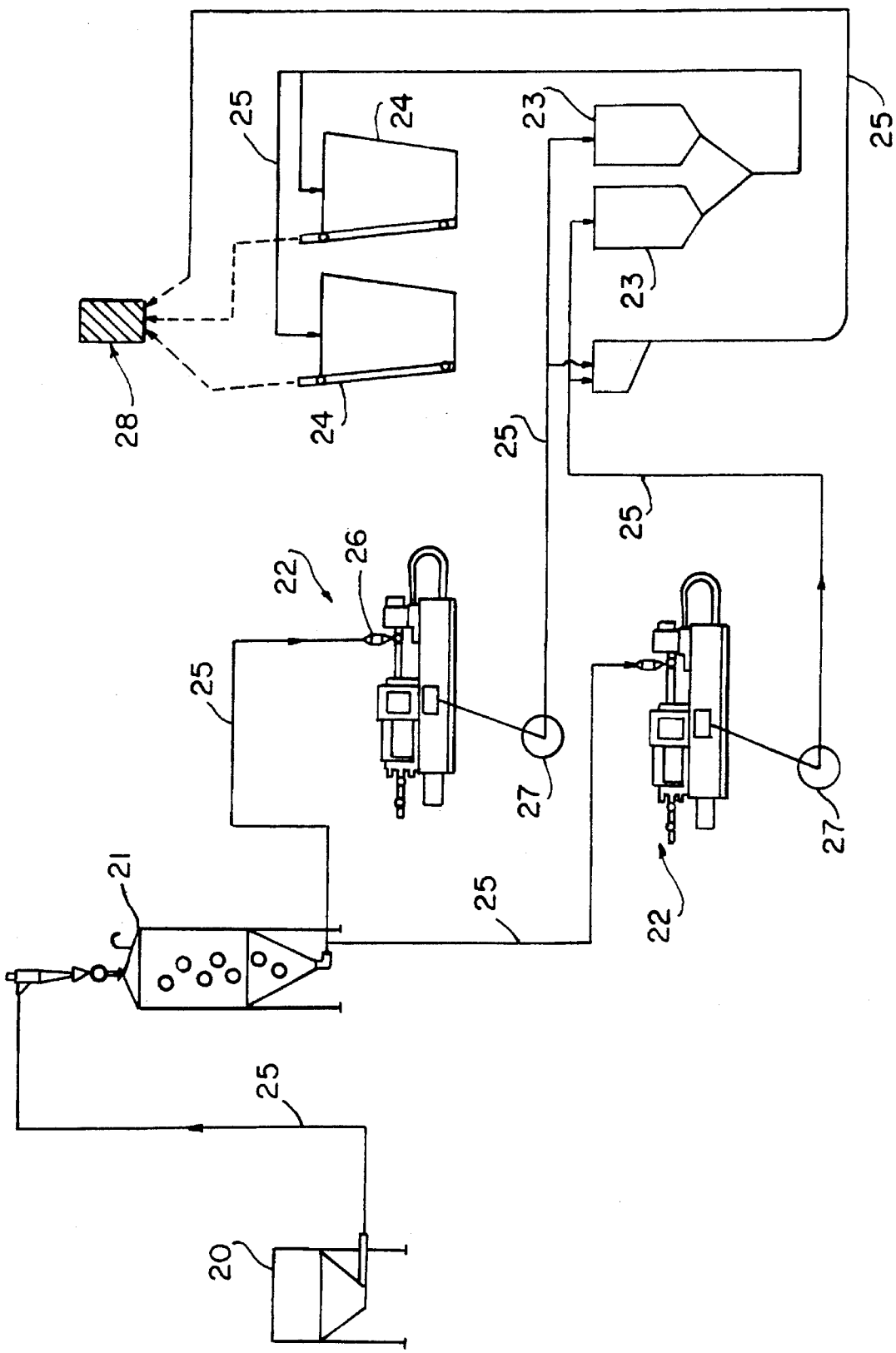
FIG. 13 is a schematic flow diagram illustrating a conveying process of resin for molding a container for a photographic film according to the process of the invention.

The container 1 for a photographic film of FIG. 12 is also in a body-cap joined type, and the cap 3 portion is joined to the container body 2 portion through a hindge. The container 1 is sealed by a shrinkable film 8 with printing, and a perforation line 9 for opening is formed on the shrinkable film 8 (Japanese Utility Model KOKAI 1-88940).

A procedure of transporting resin for forming a container for a photographic film is illustrated in FIG. 11. The resin in a form of pellet is put in a container 20, and transported from a resin manufacturer by an autotruck. The container 20 is connected to a silo 21 by a pneumatic pipe 25. The silo 21 is connected to a hopper 26 with automatic rollers of plural injection molding machines 22 by a pneumatic pipe 25. Molded container bodies are conveyed by a pneumatic conveyor 27 to provisional hoppers 23, 24 through a pneumatic pipe 25, and then conveyed to an apparatus 28 for putting a photographic film into the container body, and then fitting a cap. Preferable materials of the pneumatic pipes are stainless steel, polyethylene resin having a density of not less than 0.935 g/cm$^3$, preferably high density polyethylene resin having a density of not less than 0.941 g/cm$^3$, particularly preferably not less than 0.950 g/cm$^3$, containing lubricant or carbon black.

EXAMPLES

Example 1

The container bodies of a container for a photographic film as shown in FIG. 1 were produced.

The polypropylene resin composition used was composed of 99.2 wt. % of propylene-ethylene random copolymer resin having a MFR (ASTM D-1238 L condition) of 30 g/10 minutes, a density (ASTM D-1505) of 0.91 g/cm$^3$, a bending elastic modulus (ASTM D-790) of 10,500 kg/cm$^2$ a notched Izod impact strength (ASTM D-256) of 3.8 kg. cm/cm, a Rockwell hardness (ASTM D-785) of 90 R and an ethylene content of 2.5 wt. %, 0.05 wt. % of oleic amide, 0.2 wt. % of dimethylpolysiloxane having a viscosity of 10,000 centi stokes and 0.2 wt. % of glycerine monostearate as the lubricant, 0.3 wt. % of an organic nucleating agent of 1.3,2.4-dimethylbenzylidenesorbitol of which the surface had been coated with a higher fatty acid metal salt of magnesium stearate as the nucleating agent, and 0.05 wt. % of tetrakis [methylene-3-(3',5'-di-t-butyl-4-hydroxyphenyl-)propionate] methane. The polypropylene resin composition was formed into almost sperical pellets about 3 mm in diameter, and dried at a resin manufacturer. The pellets were packaged in a sealed container and transported in a state that the moisture content of not more than 0.2 wt. %. The pellets were conveyed pneumetrically (using stainless steel pipei to a sealed silo. The provisionally stored pellets were sucked and measured by automatic rollers mounted on an injection molding machine. Then, they were kneaded in a melted state by the screw of the extruder of the injection molding machine, and the molten resin was injected into a mold in a hot runner type having 24 cavities through 24 gates of the mold to mold the container bodies.

The injection molding conditions are as follows:

Injection molding machine: Toggle type mold clamping apparatus

Mold clamping pressure: 150 t

Molding cycle: 7 seconds (injection time:0.5 sec., injection speed pattern is shown in FIG. 14 by line a)

Resin temperature: 230° C.

Injection pressure: 60 kg/cm$^2$

Mold temperature: 40° C.

Cooling water temperature: 18° C.

Holding pressure: about 60 kg/cm$^2$

Holding pressure time: 0.6 second

The container bodies of the container body for a photographic film were molded for one week without substantial molding troubles, and could be molded under unmanned conditions without screening inspection. Moreover, since the high speed injected portion occupied more than 90%, the injection was finished before resin was cooled by contacting the mold. As a result, the occurrence of weld lines was very slight, and could not recognized by visual observation. Short shot troubles did not occurred at all. Since injecting speed was rapidly lowered by three steps, air was vented smoothly in spite of the high speed injection. Accordingly, resin yellowing by gas, burrs, stringiness and pinholes at gate portion did not occur at all. Bottom sink marks did not form by holding pressure. The molded container bodies had a high commercial value excellent in moistureproofness (2.2 mg), appearance, dropping strength from 5.4 m (occurrence of cracking: 0%) and transparency (not less than 150 cm). When the container bodies were conveyed pneumetrically at a high speed of 250 pieces/minutes to a photographic film loading process 50 meters apart therefrom through a pipe made of polyethylene resin 0.954 g/cm$^3$ in density containing 2 wt. % of carbon black, the container bodies did not damaged by abrasion or cracking. Abrasion of the pneumatic pipe was very small, and no problem occurred through continuous conveying for 5 years. On the other hand, when the above pipe was changed by a hard pipe made of acrylic resin or a soft pipe made of LDPE resin 0.925 g/cm$^3$ in density, abrasion occurred on the inner wall of each pipe. As a result, abrasion frequently occurred on the container bodies, and resin powder generated by abrasion adhered. When the holding pressure process was omitted, bottom sink mark greatly formed.

Comparative Example 1

The container bodies were produces by the same manner as Example 1, except that the molding cycle was changed to 9.1 seconds (injection time: 1.2 seconds, injection speed pattern is shown in FIG. 14 by line b).

In the container bodies, molding troubles occurred at a rate of 0.07%, and continuous unmanned molding was impossible. The occurrence of weld lines was great to degrade appearance. Dropping strength from 5.4 meters was weak (occurrence of cracking: 7%).

Comparative Example 2

The container bodies were produces by the same manner as Example 1, except that the molding cycle was changed to 10.2 seconds (injection time: 1.5 seconds, injection speed pattern is shown in FIG. 14 by line c).

In the container bodies, molding troubles occurred at a rate of 3%, and continuous unmanned molding was impossible. The occurrence of weld lines was great to degrade appearance. Dropping strength from 5.4 meters was weak (occurrence of cracking: 26%).

Example 2

The container bodies of a container for a photographic film as shown in FIG. 1 were produced.

The resin composition used was the same as Example 1, except that the propylene-ethylene random copolymer resin was changed to high density homopolyethylene resin having a MFR (ASTM D-1238 E condition) of 15 g/10 minutes, a density (ASTM D-1505) of 0.960 g/cm$^3$, a bending elastic modulus (ASTM D-747) of 9,500 kg/cm$^2$, a Shore hardness (ASTM D-2240) of 72 D, a notched Izod impact strength (ASTM D-256) of 3.8. kg.cm/cm and a Vicat softening point (ASTM D-1525) of 125° C.

The molding apparatus and molding conditions were the same as Example 1, except that the resin temperature was changed from 230° C. to 210° C.

The molded container bodies were excellent in a degree similar to Example 1.

Example 3

The container caps of a container for a photographic film as shown in FIG. 1 were produced.

The resin composition used was composed of 99.65 wt. % of low density homopolyethylene resin having a MFR (ASTM D-1238 E condition) of 30 g/10 minutes, a density (ASTM D-1505) of 0.925 g/cm$^3$ a bending rigidity (ASTM D-747) of 1,500 kg/cm$^2$ and a Vicat softening point (ASTM D-1525) of 90° C., 0.05 wt. % of oleic amide, 0.2 wt. % of glycerine monostearate, 0.1 wt. % of an organic nucleating agent of 1° 3,2.4-dimethylbenzilidene sorbitol of which the surface had been coated with magnesium stearate, and 0.05 wt. % of a hindered phenolic antioxidant of tetrakis [methylene-3-(3',5'-di-t-butyl-4-hydroxyphenyl)propionate] methane. The container caps were molded using an injection molding machine with a mold in a hot runner type having 24 cavities and a toggle type mold clamping apparatus at a mold clamping pressure of 150 t. The injection molding conditions were the same as Example 1, except that the resin temperature was changed from 230° C. to 180° C. The molding cycle was also the same 7 seconds.

The container caps were excellent in injection moldability, and the occurrence rate of molding troubles, such as deformation, short shot and rib collapse, which became a problem substantially, was 0 piece per 100,000 pieces. Continuous screening inspection was possible for a long period.

We claim:

1. A process for producing a container for a photographic film which comprises molding the container using an injection molding machine with a multicavity mold having 12 or more cavities in a hot runner by charging a thermoplastic resin having a melt flow rate of 5 to 80 g/10 minutes to the multicavity mold, wherein 70% or more of the total injected resin amount at each shot is injected at an injection speed which is adjusted to from 150 to 270 mm/sec., and the remaining resin at each shot is injected at a final injection speed which is adjusted to from 3 to 90 mm/sec.;

wherein the thermoplastic resin is a polyolefin resin.

2. The process of claim 1, wherein the process comprises retracting once or stopping the screw of the injection molding machine after charging the thermoplastic resin has finished while cooling the charged resin, and then loading again an injection holding pressure.

3. The process of claim 1, wherein the injection molding machine has a toggle type mold clamping means.

4. The process of claim 2, wherein the injection molding machine has a toggle type mold clamping means.

5. The process of claim 1, wherein the thermoplastic resin contains at least one of an antioxidant or a light-shielding material.

6. The process of claim 1, wherein the thermoplastic resin contains one or more members selected from the group consisting of a lubricant, an antioxidant, a surfactant and dripproofing agent in an amount of 0.001 to 10 wt. % in total.

7. The process of claim 1, wherein the thermoplastic resin contains an inorganic nucleating agent, an organic nucleating agent or a mixture thereof and 50 wt. % or more of a polyolefin resin experimentally having a heat history at least twice of 150° C.

8. The process of claim 1, wherein the thermoplastic resin contains either or both of a homopolyethylene resin and an ethylene-α-olefin copolymer resin each having a melt flow rate of 5 to 50 g/10 minutes, a density of 0.941 to 0.985 g/cm$^3$, a notched Izod impact strength at 23° C. of at least 2.5 kg.cm/cm and a Vicat softening point of at least 100° C. in an amount of at least 70 wt. % in total.

9. The process of claim 1, wherein the process additionally comprises roughening a face of a container body of the container in an amount of 0.001 to 10 μm as a difference in height on the inner peripheral wall.

10. The process of claim 1, wherein the thermoplastic resin contains a combination of 0.001 to 1 wt. % of a hindered phenolic antioxidant and 0.001 to 1 wt. % of a phosphite antioxidant.

11. The process of claim 8, wherein the thermoplastic resin further contains either or both of a thermoplastic resin elastomer and a synthetic rubber in an amount of 2 to 45 wt. %.

12. A process of claim 1, wherein the polyolefin resin is selected from the group consisting of ethylene copolymer resins, homopolyethylene resin, homopolypropylene resin, and propylene copolymer resins.

13. A process of claim 1, wherein the polyolefin resin is blended with one or more of thermoplastic elastomers selected from the group consisting of propylene-ethylene elastomer, propylene-ethylene-diene elastomer, and synthetic rubbers.

* * * * *